(12) United States Patent
Furnas et al.

(10) Patent No.: US 11,573,078 B2
(45) Date of Patent: Feb. 7, 2023

(54) APPARATUS AND METHOD FOR DETERMINING REFRACTIVE INDEX, CENTRAL TENSION, OR STRESS PROFILE

(71) Applicant: CORNING INCORPORATED, Corning, NY (US)

(72) Inventors: William John Furnas, Elmira, NY (US); Jin Su Kim, Seoul (KR); Balamurugan Meenakshi Sundaram, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 77 days.

(21) Appl. No.: 17/103,105

(22) Filed: Nov. 24, 2020

(65) Prior Publication Data
US 2021/0156674 A1 May 27, 2021

Related U.S. Application Data

(60) Provisional application No. 62/941,167, filed on Nov. 27, 2019.

(51) Int. Cl.
*G01B 11/16* (2006.01)
*G01L 1/24* (2006.01)

(52) U.S. Cl.
CPC ............ *G01B 11/168* (2013.01); *G01L 1/24* (2013.01)

(58) Field of Classification Search
CPC ......... G01B 11/168; G01L 1/24; G01L 1/241; G01M 11/081; G01N 21/41; G01N 21/21; G01N 21/211; G01N 2021/216
See application file for complete search history.

(56) References Cited

U.S. PATENT DOCUMENTS

| | | | | |
|---|---|---|---|---|
| 5,095,515 A | * | 3/1992 | Seaver | G02F 1/3131 385/16 |
| 5,589,931 A | * | 12/1996 | Rapoport | G01L 1/241 73/800 |
| 8,328,417 B2 | | 12/2012 | Duran | |

(Continued)

FOREIGN PATENT DOCUMENTS

| CN | 108349793 A | 7/2018 |
|---|---|---|
| DE | 102010039567 A1 | 6/2011 |

(Continued)

*Primary Examiner* — Mohamed K Amara

(57) ABSTRACT

Apparatus can comprise a cavity at least partially defined by a first major surface of a reference block and configured to receive a sample. The apparatus can comprise a first polarization-switching light source configured to emit a first polarization-switched light beam toward the cavity and a first detector configured to detect a corresponding signal. The apparatus can comprise a second polarization-switching light source configured to emit a second polarization-switched light beam toward the cavity and a second detector configured to detect a corresponding signal. The first reference block can be positioned between the second detector and the second reference block. Methods of determining an estimated stress profile can comprise determining a central tension from a measured retardation profile of the sample. Methods can comprise determining an initial stress profile from a refractive index profile of the sample. Methods can comprise scaling and adjusting stress profiles.

26 Claims, 12 Drawing Sheets

(56) References Cited

U.S. PATENT DOCUMENTS

| | | | |
|---|---|---|---|
| 8,873,028 B2* | 10/2014 | Sheldon | G01B 9/02014 |
| | | | 356/497 |
| 9,140,543 B1 | 9/2015 | Allan et al. | |
| 9,534,981 B2* | 1/2017 | Roussev | G01L 1/248 |
| 9,897,574 B2 | 2/2018 | Roussev et al. | |
| 11,060,930 B2* | 7/2021 | Shang | G01L 1/24 |
| 11,105,612 B2* | 8/2021 | Andrews | G01J 4/02 |
| 2009/0119808 A1* | 5/2009 | Giakos | G01J 4/04 |
| | | | 977/953 |
| 2011/0043787 A1 | 2/2011 | Duran | |
| 2014/0368808 A1* | 12/2014 | Roussev | G01L 1/24 |
| | | | 356/32 |
| 2015/0066393 A1* | 3/2015 | Liu | G01N 21/23 |
| | | | 702/42 |
| 2015/0338308 A1* | 11/2015 | Li | G01L 1/24 |
| | | | 356/73.1 |
| 2018/0172634 A1 | 6/2018 | Andrews et al. | |
| 2018/0274997 A1* | 9/2018 | Shang | G01L 1/24 |
| 2019/0033144 A1* | 1/2019 | Andrews | G01N 21/23 |
| 2019/0219463 A1* | 7/2019 | Orihara | G01N 21/21 |
| 2020/0300615 A1* | 9/2020 | Andrews | G01L 1/241 |

FOREIGN PATENT DOCUMENTS

| | | |
|---|---|---|
| EP | 3350137 A1 | 7/2018 |
| JP | 2011-043503 A | 3/2011 |
| JP | 2017-009338 A | 1/2017 |
| TW | 201720779 A | 6/2017 |
| WO | 2017/049028 A1 | 3/2017 |

* cited by examiner

APPARATUS AND METHOD FOR DETERMINING REFRACTIVE INDEX, CENTRAL TENSION, OR STRESS PROFILE

CROSS REFERENCE TO RELATED APPLICATIONS

This application claims the benefit of priority under 35 U.S.C. § 119 of U.S. Provisional Application No. 62/941,167, filed Nov. 27, 2019, the content of which is incorporated herein by reference in its entirety.

FIELD

The present disclosure relates generally to apparatus and methods for determining a stress characteristic and, more particularly, to apparatus and methods for determining a refractive index, a central tension, or a stress profile.

BACKGROUND

Light-scattered polarimetry (LSP) uses scattered polarized light to determine stress-based characteristics of samples capable of scattering light from within the sample material. The sample is irradiated with input light at a relatively shallow angle. The light polarization is varied continuously between different polarization states using an optical compensator. The scattered light is detected by an image sensor. Stress in the sample causes optical retardation along the light path, with the amount of stress being proportional to the derivative of the optical retardation. The amount of optical retardation can be determined from the detected scattered light intensity distribution, which varies due to the constructive and destructive interference for the different effective path lengths of the detected light. The stress-related properties that can be measured include stress profiles, central tension (CT) and depth of compression (DOC). However, measurements can be subject to noise and measurements for the region in compression can be unreliable.

The refractive near field (RNF) method measures refractive index and birefringence profiles (and thus stress) of samples. The RNF method passes input light through the sample and a reference block in contact with the sample being measured. A prism is also used to couple light out of the sample to a transverse electric (TE) mode spectrum and a transverse magnetic (TM) spectrum that are measured by an image sensor. The TE and TM modes spectrum are analyzed to extract stress-related characteristics, including a stress profile. However, the magnitude of the stress profile can be unreliable and subject to drift over a thickness of the sample.

Consequently, there is a need for methods of measuring CT that are more reliable and are subject to lower variability. Also, there is a need for an apparatus and method for making more accurate measurements with the RNF method. Additionally, there is a need for a combined apparatus capable of using both LSP and RNF to measure a more accurate stress profile and a method of using such apparatus.

SUMMARY

There are set forth herein apparatus and methods for determining refractive index, central tension, or stress profiles for samples. A combined apparatus for measurements using LSP and RNF can simplify and speed up the measurement process. Also, the combined apparatus reduces the risk of sample breakage because less handling is required to load the sample into the combined apparatus as compared to two separate apparatus. Methods of using the combined apparatus can additionally produce more reliable measurements for overall stress profiles.

The combined apparatus or an LSP apparatus can be used in a method of measuring a central tension (CT). The methods of the disclosure can produce more reliable CT measurements excluding noisy portions (e.g., one or more end portions) of the measurement near the edge of the CT region (e.g., an interface between layers in a laminate). Methods of the disclosure can also produce more reliable CT measurement by moving the sample during measurement, which can be processed to produce an averaged intensity distribution with lower noise.

The combined apparatus or an RNF apparatus can comprise more than one reference block. Positioning reference blocks that sandwich a cavity configured to receive a sample can provide a means to correct drift and other systematic errors present in the measurement. Providing at least one reference block with a first refractive index and a fluid comprising a third refractive index that straddles an estimated refractive index (e.g., range of an estimated refractive index profile) of the sample can provide more accurate and reproducible measurements of refractive index and/or stress profile. Further, providing a magnitude of a minimum difference between the at least one reference block comprising the first refractive index and the estimated refractive index (e.g., extrema of an estimated refractive index profile) of the sample that is in a range from about 0.7% to about 10% of the sample refractive index and/or is in a range from about 0.006 to about 0.10 can provide further improvements in the reliability and/or reproducibility of the refractive index and/or stress profile measurement. Further, providing a magnitude of a minimum difference between the fluid comprising the third refractive index and the estimated refractive index (e.g., extrema of an estimated refractive index profile) of the sample that is in a range from about 0.7% to about 10% of the sample refractive index and/or is in a range from about 0.006 to about 0.10 can provide further improvements in the reliability and/or reproducibility of the refractive index and/or stress profile measurement. In some embodiments, the at least one reference block and/or fluid can be replaced after measuring a corrected refractive index (e.g., refractive index profile) of the sample so that the at least one reference block and/or fluid satisfy the above condition(s). In the combined apparatus, in some embodiments, the first reference block can comprise the prism.

Some example embodiments of the disclosure are described below with the understanding that any of the features of the various embodiments may be used alone or in combination with one another.

In some embodiments, an apparatus for measuring a stress profile of a sample can comprise a cavity at least partially defined by a first major surface of a first reference block comprising a first refractive index. The cavity can be configured to receive the sample. The apparatus can comprise a polarization-switching light source configured to emit a first polarization-switched light beam toward the cavity. The apparatus can comprise a second polarization-switching light source configured to emit a second polarization-switched light beam toward the cavity. The apparatus can comprise a first detector configured to detect a signal from the first polarization-switched light beam. The apparatus comprises a second detector configured to detect a signal from the second polarization-switched light beam. The first reference block can be positioned between the second detector and the first reference block. The first reference block can be positioned between the second detector and the second reference block.

In further embodiments, the apparatus can further comprise a sample holder. The sample holder is translatable in a direction perpendicular to the first major surface.

In even further embodiments, the sample holder can be positioned between the second polarization-switching light source and the cavity.

In even further embodiments, the sample holder can be positioned between the first polarization-switching light source and the cavity.

In even further embodiments, the second polarization-switching light beam can be configured to travel along a second beam path. The sample holder can comprise a first major surface facing the cavity and a second major surface opposite the first major surface. The second beam path can impinge on the second major surface of the sample holder at an angle relative to a direction normal to the second major surface of the sample holder in a range from about 10° to about 15°.

In further embodiments, the apparatus further comprises a second reference block can comprise a second major surface. The cavity can be further defined by the second major surface. The first reference block can comprise a first refractive index. The second reference block can comprise a second refractive index.

In even further embodiments, the second refractive index can be substantially equal to the first refractive index.

In further embodiments, the apparatus can comprise a liquid contacting the first reference block. The liquid can comprise a third refractive index.

In even further embodiments, the third refractive index can be greater than the first refractive index.

In even further embodiments, a magnitude of a difference between the first refractive index and the third refractive index can be about 0.05 or more.

In some embodiments, a method of determining an estimated stress profile of a sample can comprise measuring a retardation profile of the sample. The method can comprise determining a central tension of the sample from the measured retardation profile of the sample. The method can comprise measuring a refractive index profile of the sample. The method can comprise determining an initial stress profile of the sample from the measured refractive index profile. The method comprises scaling the initial stress profile to obtain a scaled stress profile of the sample based on the initial stress profile and the central tension. The method can comprise adjusting the scaled stress profile to obtain an estimated stress profile that is force balanced.

In further embodiments, the sample can comprise a laminate comprising a core layer positioned between a first outer layer and a second outer layer. The core layer can comprise the central tension.

In further embodiments, the sample can comprise a glass-based sample.

In further embodiments, determining the central tension can comprise determining a width of a central region comprising the central tension. Determining the central tension can comprise determining a fitting range comprising a fitting width that is less than the width of the central portion that excludes one or more end portions of the retardation profile. Determining the central tension can comprise fitting a polynomial to a portion of the retardation profile within the fitting range. Determining the central tension can comprise determining the central tension of the sample from the fitted polynomial.

In further embodiments, the method can comprise contacting the first reference block with a liquid.

In even further embodiments, the liquid can comprise a third refractive index less than the first refractive index.

In further embodiments, measuring the refractive index profile can comprise positioning the sample between a first reference block and a second reference block. The first reference block can comprise a first refractive index. The second reference block can comprise the first refractive index. Measuring the refractive index profile and determining an initial stress profile can comprise emitting a second polarization-switched light beam from a second polarization-switching light source. Measuring the refractive index profile and determining an initial stress profile further comprises transmitting the second polarization-switched light beam through the first reference block, the sample, and the second reference block. Measuring the refractive index profile and determining an initial stress profile can comprise detecting the transmitted second polarization-switched light beam to determine a detected signal. Measuring the refractive index profile and determining an initial stress profile can comprise adjusting the detected signal based on data in the detected signal corresponding to the first reference block and the second reference block to determine a refractive index profile.

In even further embodiments, a magnitude of a minimum difference between the first predetermined refractive index and an estimated refractive index of the sample can be in a range from about 0.7% to about 10% of the estimated refractive index. A magnitude of a minimum difference between the second predetermined refractive index can be in a range from about 0.7% to about 10% of the estimated refractive index.

In further embodiments, measuring the refractive index profile and determining an initial stress profile comprises positioning a first reference block can comprise a first predetermined refractive index between the sample and a second polarization-switching light source. Measuring the refractive index profile and determining an initial stress profile can comprise contacting the first reference block with a liquid comprising a second predetermined refractive index. Measuring the refractive index profile and determining an initial stress profile can comprise emitting a second polarization-switched light beam from the second polarization-switching light source. Measuring the refractive index profile and determining an initial stress profile additionally comprises transmitting the second polarization-switched light beam through the liquid, the first reference block, and the sample. Measuring the refractive index profile and determining an initial stress profile can comprise detecting the transmitted second polarization-switched light beam to determine a detected signal. Measuring the refractive index profile and determining an initial stress profile also comprises determining the estimated stress profile based on the transmitted signal and the corrected refractive index. A magnitude of a minimum difference between the first predetermined refractive index and an estimated refractive index of the sample can be in a range from about 0.7% to about 10% of the estimated refractive index. A magnitude of a minimum difference between the second predetermined refractive index can be in a range from about 0.7% to about 10% of the estimated refractive index.

In even further embodiments, the magnitude of a minimum difference between the first predetermined refractive index and an estimated refractive index of the sample can be in a range from about 0.006 to about 0.10. The magnitude of a minimum difference between the second predetermined refractive index and an estimated refractive index of the sample can be in a range from about 0.006 to about 0.10.

In further embodiments, measuring the refractive index profile can comprise simultaneously measuring the refractive index profile using two detectors oriented at an angle in a range from about 85° to about 95° relative to each other.

In some embodiments, a refractive near field apparatus can comprise a first reference block comprising a first refractive index and a first major surface. The apparatus can comprise a second reference block comprising a second refractive index and comprising a second major surface facing the first major surface. The apparatus can comprise a cavity defined between the first major surface and a second major surface configured to receive a sample. The apparatus can comprise a liquid comprising a third refractive index contacting the first reference block and the second reference block.

In further embodiments, the third refractive index can be greater than the first refractive index.

In further embodiments, the third refractive index can be less than the first refractive index.

In further embodiments, a magnitude of a difference between the first refractive index and the third refractive index can be about 0.05 or more.

In further embodiments, the second refractive index can be substantially equal to the first refractive index.

In further embodiments, the apparatus can further comprise a sample holder translatable in a direction perpendicular to the first major surface.

In even further embodiments, the sample holder can be positioned between the second polarization-switching light source and the cavity.

In even further embodiments, the second polarization-switched light beam can be configured to travel along a second beam path. The sample holder can comprise a first major surface facing the cavity and a second major surface opposite the first major surface. The second beam path can impinge on the second major surface of the sample holder at an angle relative to a direction normal to the second major surface of the sample holder in a range from about 10° to about 15°.

In some embodiments, a method of determining a stress profile of a sample comprising a sample refractive index can comprise positioning the sample between a first reference block comprising a first refractive index and a second reference block comprising the first refractive index. The method can comprise emitting a second polarization-switched light beam from a second polarization-switching light source. The method further comprises transmitting the second polarization-switched light beam through the first reference block, the sample, and the second reference block. The method can comprise detecting the transmitted second polarization-switched light beam to determine a detected signal. The method also comprises adjusting the detected signal based on data in the detected signal corresponding to the first reference block and the second reference block to determine a corrected signal. The method can comprise determining an estimated stress profile based on the corrected signal.

In further embodiments, a magnitude of a minimum difference between the first refractive index and the sample refractive index can be in a range from about 0.7% to about 10% of the sample refractive index.

In even further embodiments, the magnitude of the minimum difference between the first refractive index and the sample refractive index can be in a range from about 0.006 to about 0.10.

In further embodiments, the first refractive index can be less than the sample refractive index.

In further embodiments, the method further can comprise contacting the first reference block with a liquid comprising a second refractive index.

In even further embodiments, the second refractive index can be greater than the first refractive index.

In even further embodiments, the second refractive index can be greater than the sample refractive index.

In further embodiments, a magnitude of a minimum difference between the second refractive index and the sample refractive index can be in a range from about 0.7% to about 10% of the sample refractive index.

In even further embodiments, the magnitude of the minimum difference between the second refractive index can be in a range from about 0.006 to about 0.10.

In further embodiments, the sample can comprise a glass-based sample.

In further embodiments, the sample can comprise a laminate.

In some embodiments, a method of determining a stress profile of a sample can comprise positioning a first reference block comprising a first predetermined refractive index between the sample and a second polarization-switching light source. The method can comprise contacting the first reference block with a liquid comprising a second predetermined refractive index. The method can comprise emitting a second polarization-switched light beam from the second polarization-switching light source. The method additionally comprises transmitting the second polarization-switched light beam through the liquid, the first reference block, and the sample. The method can comprise detecting the transmitted second polarization-switched light beam to determine a detected signal. The method also comprises determining a stress profile based on the transmitted signal and the corrected refractive index. A magnitude of a minimum difference between the first predetermined refractive index and an estimated refractive index of the sample can be in a range from about 0.7% to about 10% of the estimated refractive index. A magnitude of a minimum difference between the second predetermined refractive index can be in a range from about 0.7% to about 10% of the estimated refractive index.

In further embodiments, the magnitude of a minimum difference between the first predetermined refractive index and an estimated refractive index of the sample is in a range from about 0.006 to about 0.10. The magnitude of a minimum difference between the second predetermined refractive index and an estimated refractive index of the sample is in a range from about 0.006 to about 0.10.

In some embodiments, a method of determining a corrected refractive index of a sample can comprise positioning a first reference block comprising a first predetermined refractive index between the sample and a second polarization-switching light source. The method can comprise contacting the first reference block with a liquid comprising a second predetermined refractive index. The method can comprise emitting a second polarization-switched light beam from the second polarization-switching light source. The method can comprise transmitting the second polarization-switched light beam through the liquid, the first reference block, and the sample. The method can comprise detecting the transmitted second polarization-switched light beam. The method can comprise estimating an estimated refractive index of the sample based on the detected signal. The method can comprise replacing the first reference block with another reference block comprising a first corrected refractive index. The method can comprise replacing the liquid with another liquid comprising a second corrected refractive index. The method can comprise transmitting the second polarization-switched light beam through the liquid, the first reference block, and the sample. The method can comprise detecting the transmitted second polarization-switched light beam to determine a detected signal. The method can comprise estimating a corrected refractive index of the sample based on the detected signal. The method can comprise determining a stress profile based on the transmitted signal and the corrected refractive index. A magnitude of a minimum difference between the first corrected refractive index and the estimated refractive index of the sample can be in a range from about 0.7% to about 10% of the estimated refractive index. A magnitude of a minimum difference between the second corrected refractive index can be in a range from about 0.7% to about 10% of the estimated refractive index.

In further embodiments, the minimum difference between the first corrected refractive index and the estimated refractive index of the sample can be in a range from about 0.006 and 0.10. The magnitude of a minimum difference between the second corrected refractive index is in a range from about 0.006 to about 0.10.

In some embodiments, a method of determining a central tension of a sample can comprise measuring a retardation profile of the sample. The method can comprise determining a width of a central region comprising the central tension. The method can comprise determining a fitting range comprising a fitting width that is less than the width of the central portion that excludes one or more end portions of the retardation profile. The method can comprise fitting a polynomial to a portion of the retardation profile within the fitting range. The method can comprise determining the central tension of the sample from the fitted polynomial.

In further embodiments, the sample can comprise a glass-based sample.

In further embodiments, the sample can comprise a laminate comprising a core layer positioned between a first outer layer and a second outer layer, the core layer comprising the central tension.

In further embodiments, the fitted polynomial can comprise a line.

BRIEF DESCRIPTION OF THE DRAWINGS

The above and other features and advantages of embodiments of the present disclosure are better understood when the following detailed description is read with reference to the accompanying drawings, in which.

Figure 1:
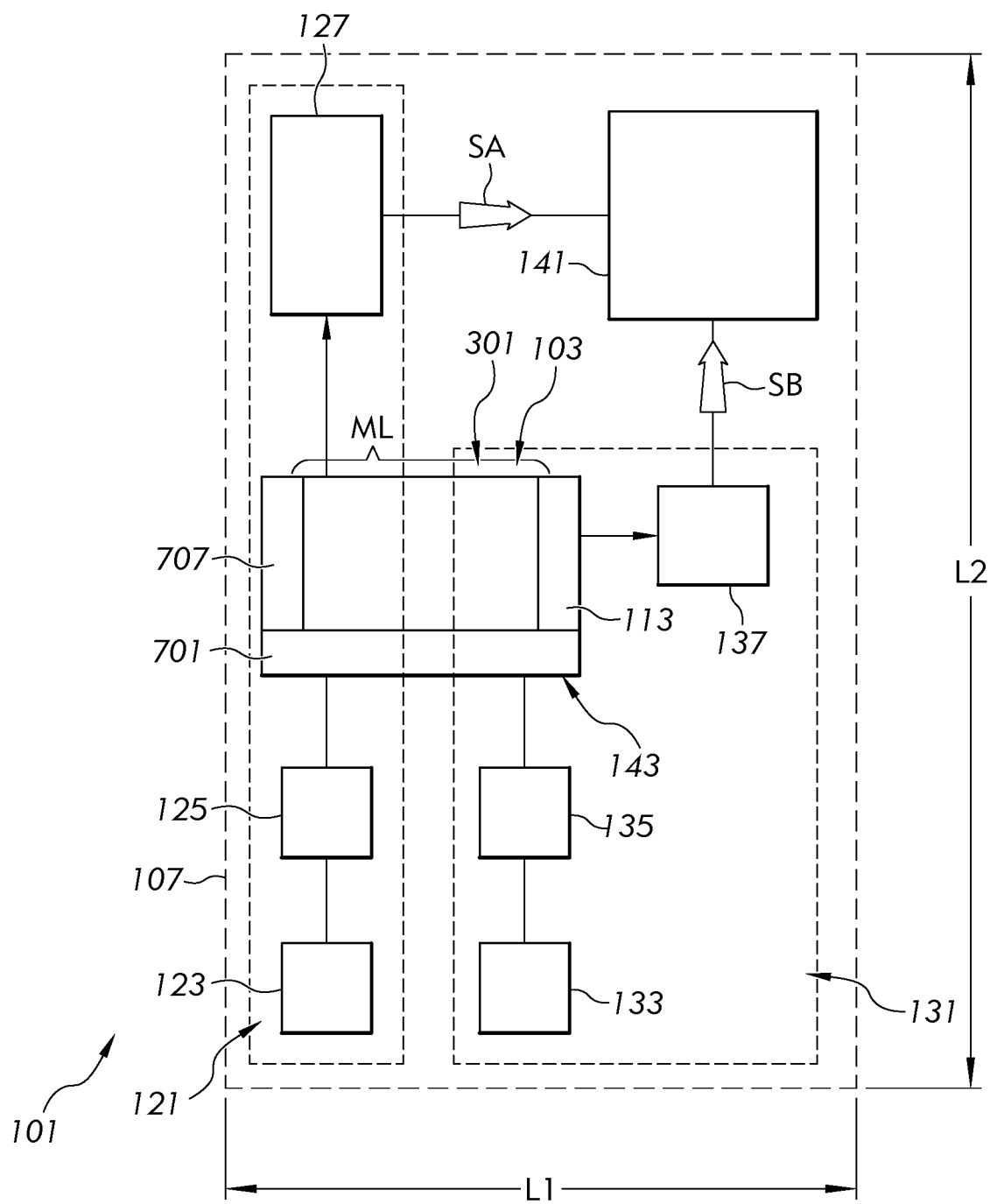
FIG. 1 is a schematic view of an example combined apparatus according to some embodiments.

Throughout the disclosure, the drawings are used to emphasize certain aspects. As such, it should not be assumed that the relative size of different regions, portions, and substrates shown in the drawings are proportional to its actual relative size, unless explicitly indicated otherwise.

DETAILED DESCRIPTION

Embodiments will now be described more fully hereinafter with reference to the accompanying drawings in which example embodiments are shown. Whenever possible, the same reference numerals are used throughout the drawings to refer to the same or like parts. However, claims may encompass many different aspects of various embodiments and should not be construed as limited to the embodiments set forth herein.

FIGS. 1-5 and 7 illustrate views apparatus in accordance with the embodiments of the disclosure. Unless otherwise noted, a discussion of features of embodiments of one foldable apparatus can apply equally to corresponding features of any of the embodiments of the disclosure. For example, identical part numbers throughout the disclosure can indicate that, in some embodiments, the identified features are identical to one another and that the discussion of the identified feature of one embodiment, unless otherwise noted, can apply equally to the identified feature of any of the other embodiments of the disclosure.

Figure 2:
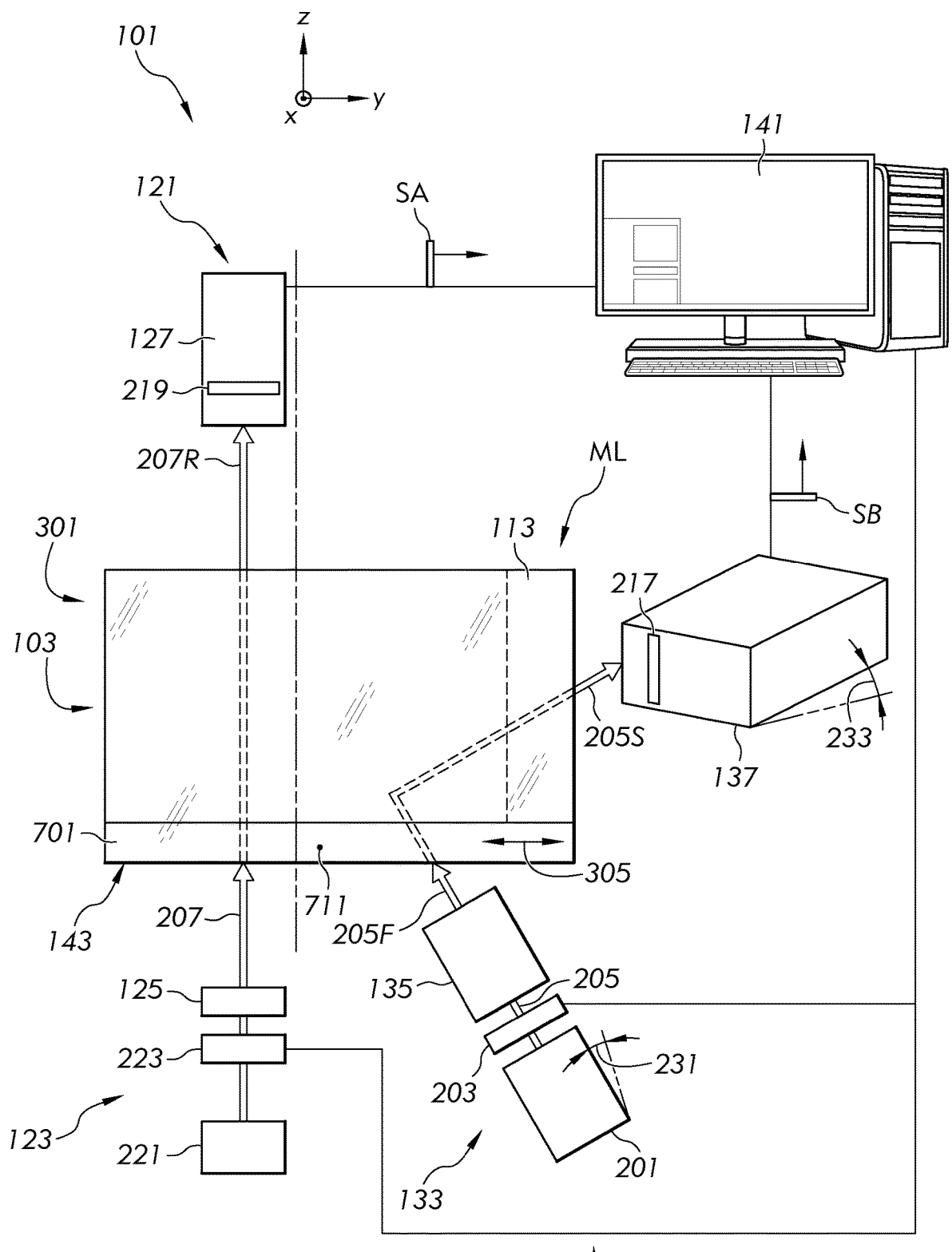
FIG. 2 is a schematic view of an example combined apparatus according to some embodiments.
Figure 3:
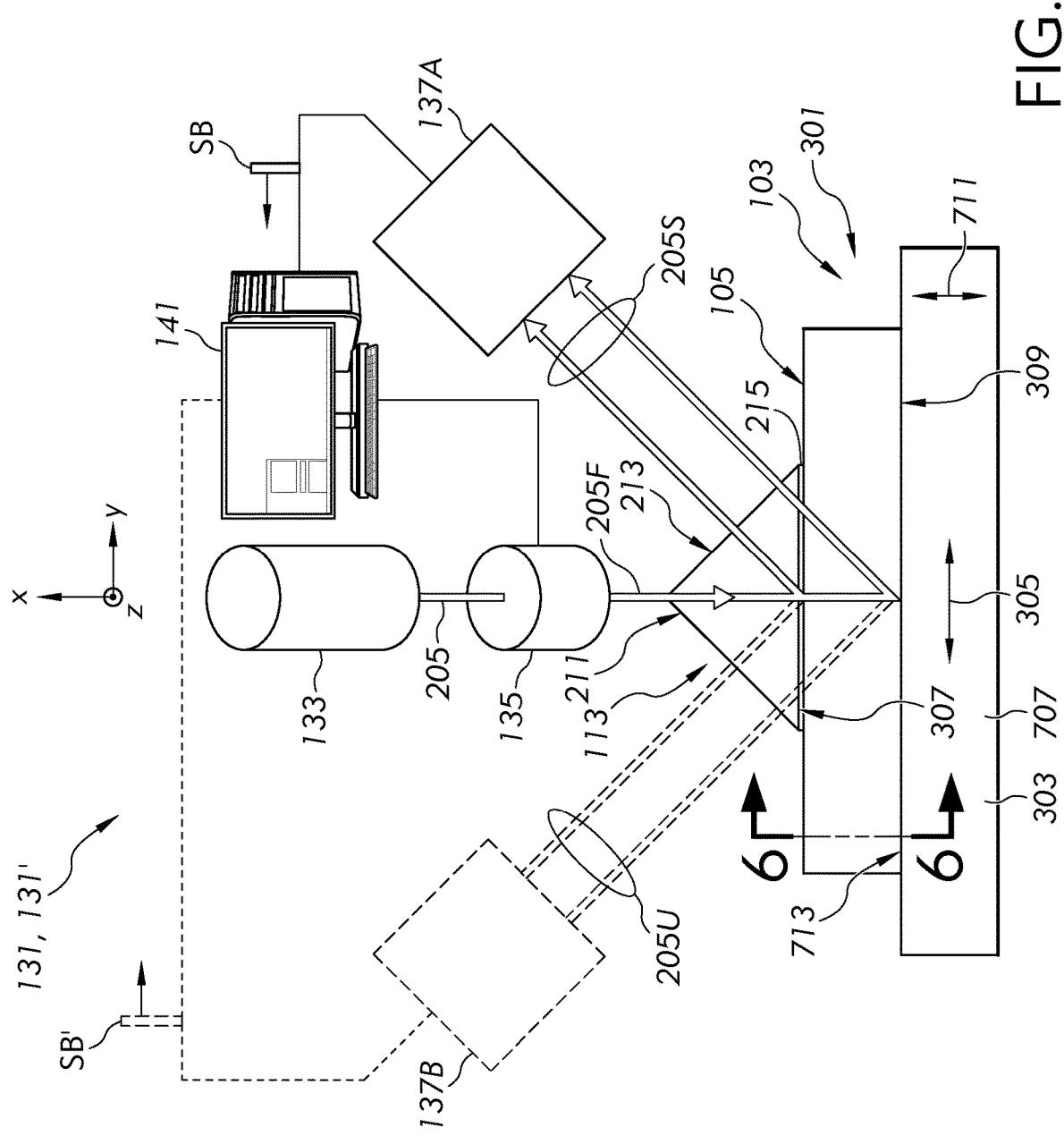
FIG. 3 is a schematic view of an example light-scattered polarimetry apparatus according to some embodiments.
Figure 4:
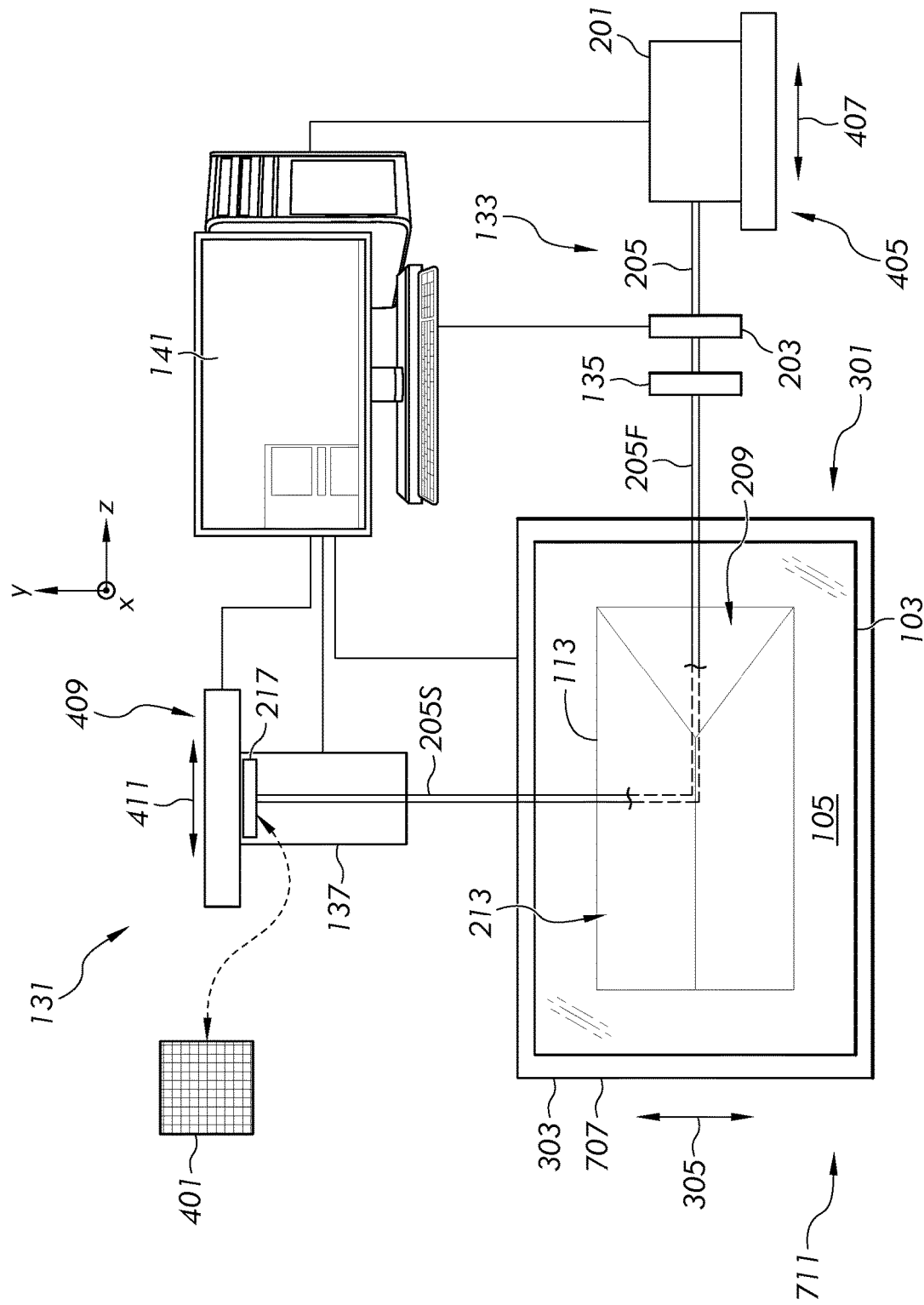
FIG. 4 is a schematic view of an example light-scattering polarimetry apparatus according to some embodiments.
Figure 5:
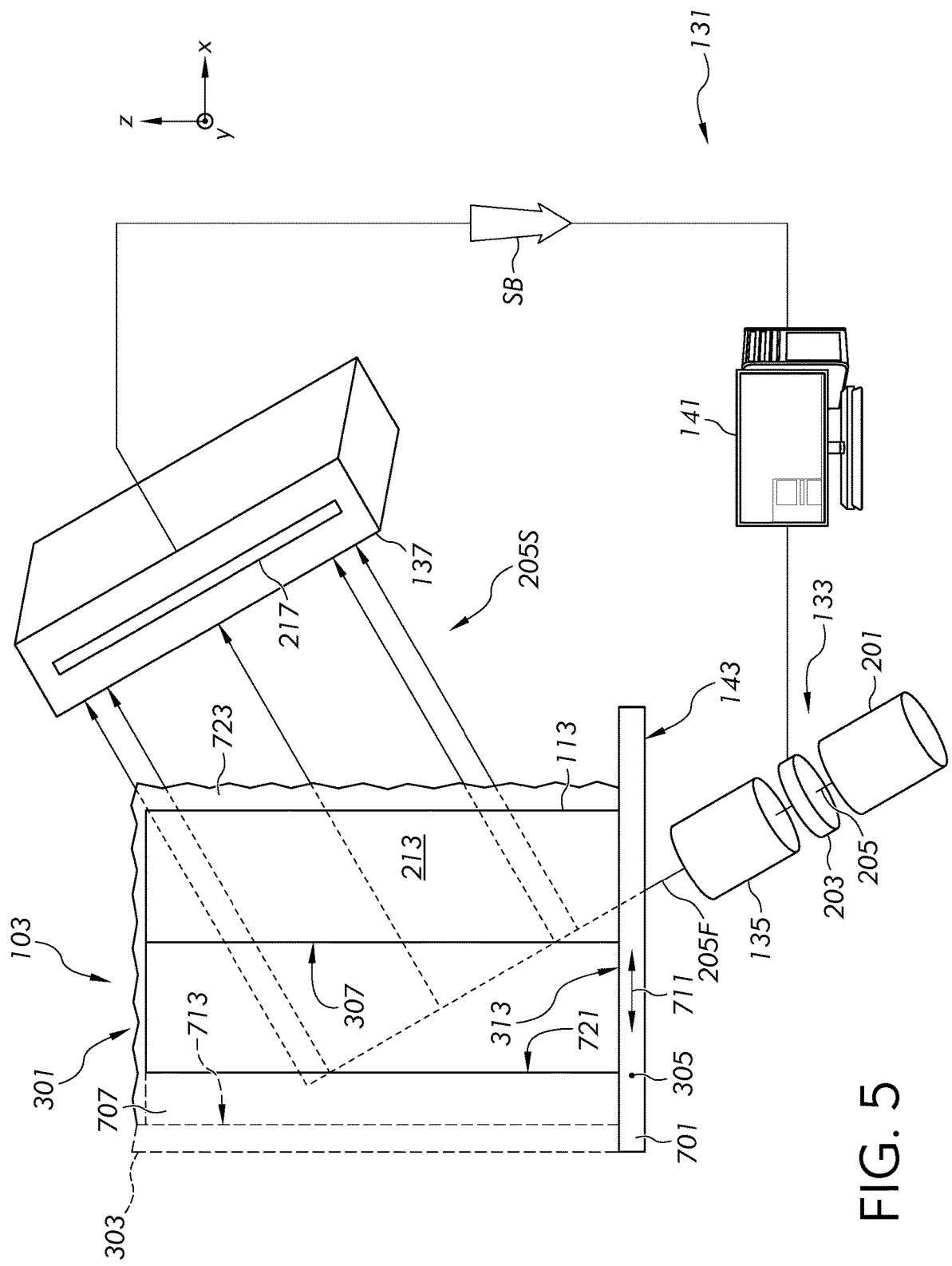
FIG. 5 is a schematic view of an example light-scattering polarimetry apparatus according to some embodiments.
Figure 7:
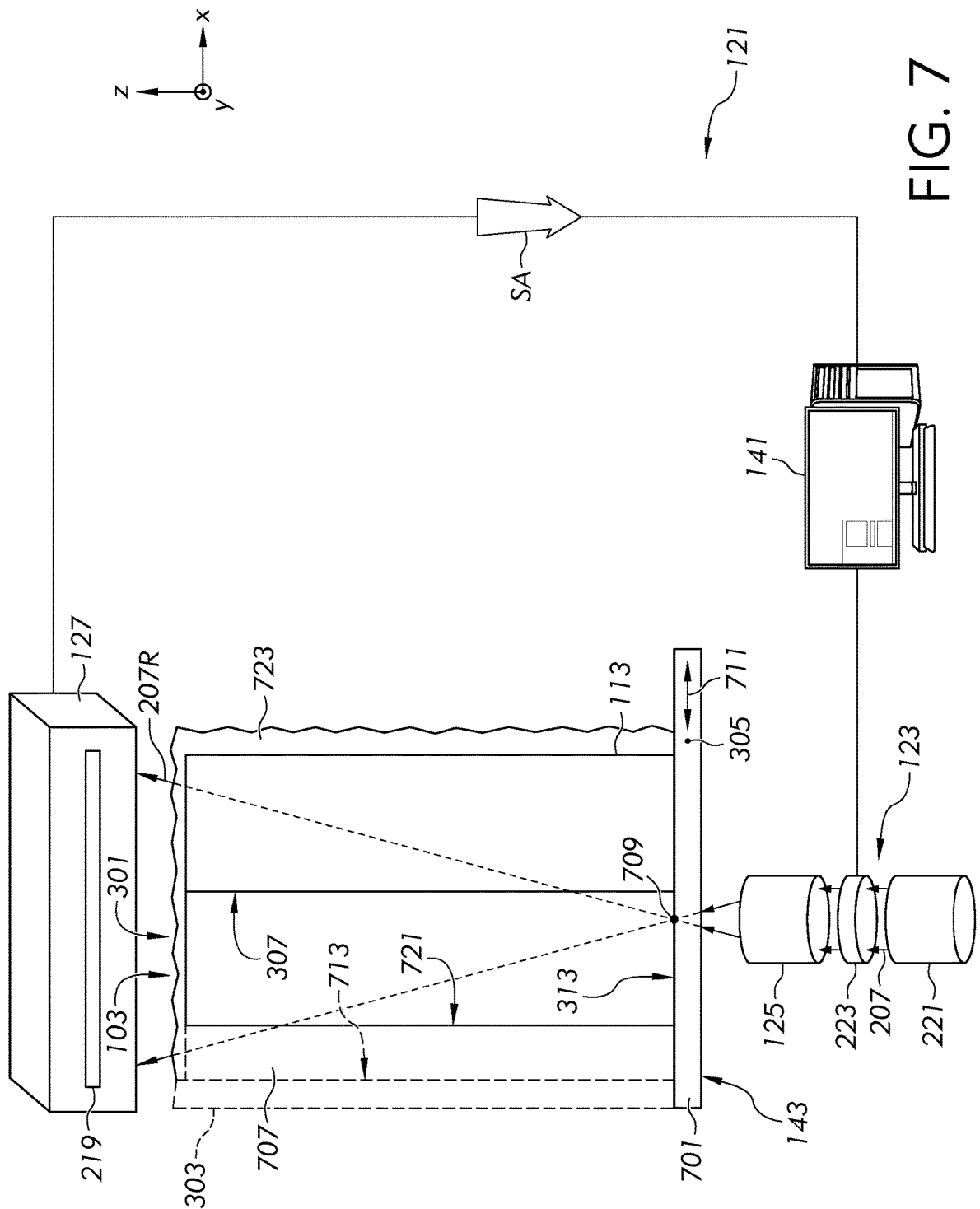
FIG. 7 is a schematic view of an example refractive near field apparatus according to some embodiments.

FIGS. 1-5 and 7 schematically illustrate example embodiments of apparatus in accordance with the embodiments of the disclosure. As shown in FIGS. 1-2, the apparatus can be a combined apparatus 101 comprising a light-scattering polarimeter (LSP) apparatus 131 and a refractive near field (RNF) apparatus 121. In some embodiments, as shown in FIGS. 3-5, embodiments of the apparatus can comprise the LSP apparatus 131, 131' as a stand-alone apparatus. In some embodiments, as shown in FIG. 7, embodiments of the apparatus can comprise the RNF apparatus 121 as a stand-alone apparatus. As such, it is to be understood that a discussion of the LSP apparatus 131 in the combined apparatus 101 is applicable to the corresponding features of the stand-alone LSP apparatus 131, 131' and vice versa unless otherwise indicated. Likewise, it is to be understood that a discussion of the RNF apparatus 121 in the combined apparatus 101 is applicable to the stand-alone RNF apparatus 121 and vice versa unless otherwise indicated.

FIGS. 1-2 schematically illustrate the combined apparatus 101 that can comprise a housing 107 enclosing the LSP apparatus 131 and the RNF apparatus 121. In some embodiments, a housing 107 or other area of the combined apparatus 101 can comprise first dimension L1 and a second dimension L2 where components of the combined apparatus 101 are confined within an area defined by the first dimension L1 and the second dimension L2. In some embodiment, L1 and/or L2 can be in a range from about 200 mm to 1 meter, from about 200 mm to about 500 mm, from about 200 mm to about 300 mm, or any range or subrange therebetween. In some embodiments, although not shown, the controller 141 can be positioned outside of the housing 107.

As shown in FIGS. 1-5, the LSP apparatus 131, 131' can comprise a first polarization-switching light source 133. In some embodiments, as shown in FIG. 2, the first polarization-switching light source 133 can comprise a first light source 201 and a first optical compensator 203. The first light source 201 can comprise a laser, a light-emitting diode (LED), and/or an organic light emitting diode. In further embodiments, the laser can comprise a gas laser, an excimer laser, a dye laser, or a solid-state laser. Example embodiments of gas lasers include helium, neon, argon, krypton, xenon, helium-neon (HeNe), xenon-neon (XeNe), carbon dioxide ($CO_2$), carbon monoxide (CO), copper (Cu) vapor, gold (Au) vapor, cadmium (Cd) vapor, ammonia, hydrogen fluoride (HF), and deuterium fluoride (DF). Example embodiments of excimer lasers include chlorine, fluorine, iodine, or dinitrogen oxide ($N_2O$) in an inert environment comprising argon (Ar), krypton (Kr), xenon (Xe), or a combination thereof. Example embodiments of dye lasers include those using organic dyes, for example, rhodamine, fluorescein, coumarin, stilbene, umbelliferone, tetracene, or malachite green dissolved in a liquid solvent. Example embodiments of solid-state lasers include crystal lasers, fiber lasers, and laser diodes. Crystal-based lasers comprise a host crystal doped with a lanthanide, or a transition metal. Example embodiments of host crystals include yttrium aluminum garnet (YAG), yttrium lithium fluoride (YLF), yttrium othoaluminate (YAL), yttrium scandium gallium garnet (YSSG), lithium aluminum hexafluoride (LiSAF), lithium calcium aluminum hexafluoride (LiCAF), zinc selenium (ZnSe), zinc sulfide (ZnS), ruby, forsterite, and sapphire. Example embodiments of dopants include neodymium (Nd), titanium (Ti), chromium (Cr), cobalt (Co), iron (Fe), erbium (Er), holmium (Ho), thulium (Tm), ytterbium (Yb), dysprosium (Dy), cerium (Ce), gadolinium (Gd), samarium (Sm), and terbium (Tb). Example embodiments of solid crystals include ruby, alexandrite, chromium fluoride, forsterite, lithium fluoride (LiF), sodium chloride (NaCl), potassium chloride (KCl), and rubidium chloride (RbCl). Laser diodes can comprise heterojunction or PIN diodes with three or more materials for the respective p-type, intrinsic, and n-type semiconductor layers. Example embodiments of laser diodes include AlGaInP, AlGaAs, InGaN, InGaAs, InGaAsP, InGaAsN, InGaAsNSb, GaInP, GaAlAs, GaInAsSb, and lead (Pb) salts. Some laser diodes can represent exemplary embodiments because of their size, tunable output power, and ability to operate at room temperature (i.e., about 20° C. to about 25° C.).

In some embodiments, the first light source 201 can be configured to emit a first light beam comprising a first optical wavelength. In further embodiments, the first optical wavelength can be in a range from about 300 nanometers (nm) to about 1,000 nm, from about 350 nm to about 900 nm, from about 400 to about 800 nm, from about 500 nm to about 700 nm, or any range or subrange therebetween. In even further embodiments, the first wavelength can be about 365 nm, about 415 nm, or about 590 nm. In some embodiments, the first polarization-switching light source 133 is configured to emit a first polarization-switched light beam along a first path 205, 205F, 205S, 205U, as shown in FIGS. 2-4.

As shown in FIG. 2, the first optical compensator 203 can comprise a polarizing beam splitter. In further embodiments, the first optical compensator 203 can comprise a half-wave plate and a quarter-wave plate. In even further embodiments, one of the half-wave plate or the quarter-wave plate can be rotatable relative to the other, which can change the polarization of a light beam passing through it. In further embodiments, the first optical compensator 203 can comprise an electronically controlled polarization modulator, for example, a liquid-crystal-based modulator or a ferroelectric liquid-crystal-based modulator. In further embodiments, the first optical compensator 203 can be controlled by a controller 141 (discussed below).

As used herein, the first polarization-switching light source 133 (e.g., including the first optical compensator 203) is configured to cycle between two or more polarization states (polarizations). In some embodiments, the first polarization-switching light source 133 can be configured to switch between (e.g., cycle through) up to eight different polarizations that combine the linear, elliptical, and/or circular polarizations. In further embodiments, the first polarization-switching light source 133 can be configured to go through a full polarization cycle (e.g., change between two or more polarizations) in a range from less than 1 second to about 10 seconds.

In some embodiments, as shown in FIGS. 2-3, the LSP apparatus 131, 131' can comprise a first focusing lens 135. As shown, the first focusing lens 135 can be positioned along the first path 205 of the first polarization-switched light beam. After passing through the first focusing lens 135, the first polarization-switched light beam can be focused along portion 205F of the first path. The first focusing lens 135 can comprise a convex lens and/or an adjustable focal length lens. In some embodiments, the first focusing lens 135 can be configured to collimate the first polarization-switched light beam along portion 205F of the first path. In some embodiments, although not shown, a bandpass filter, additional focusing lenses, a light diffuser, a beam splitter, and/or an attenuator can be positioned along portions 205, 205F, and/or 205S of the first path. In further embodiments, one or more of these additional elements can be controlled by the controller 141.

In some embodiments, as shown in FIGS. 1 and 3-5, the LSP apparatus 131, 131' can comprise a prism 113. In further embodiments, as shown in FIG. 4, the prism 113 can optionally comprise an input surface 209 and a first output surface 213. In further embodiments, as shown in FIG. 3, the prism 113 can comprise a second output surface 211. In further embodiments, as shown in FIG. 3, the prism 113 can comprise a specimen coupling surface 307. In even further embodiments, the specimen coupling surface 307 of the prism 113 can at least partially define a cavity 301 configured to receive a sample 103. In even further embodiments, the specimen coupling surface 307 of the prism 113 can face an index matching fluid 215. In still further embodiments, the specimen coupling surface 307 of the prism 113 can contact the index matching fluid 215.

As shown in FIGS. 1-5, the LSP apparatus 131, 131' can comprise a first detector 137. In some embodiments, the first detector 137 can comprise a digital camera, a CCD, and/or an array of photodetectors. In some embodiments, the first detector may comprise one or more focusing lenses, an attenuator, and/or a beam splitter. In some embodiments, as shown in FIGS. 2 and 4, the first detector 137 can comprise an image sensor 217. In further embodiments, as shown in FIGS. 4-5, the image sensor 217 can comprise an array of imaging pixels 401. In even further embodiments, the array of imaging pixels can comprise a two-dimensional array. In even further embodiments, a maximum dimension of a pixel of the array of imaging pixels can be in a range from about 1 micrometer (μm) to about 15 μm, from about 2 μm to about 10 μm, from about 5 μm to about 8 μm, or any range or subrange therebetween. In further embodiments, as shown in FIGS. 3-5, the first detector 137 can face the first output surface 213 of the prism 113. In further embodiments, the first detector 137 can be positioned along the first path 205S to detect a signal from the scattered first polarization-switched light beam that traveled through the prism 113. As shown in FIGS. 1-4, the first detector 137 can be connected to the controller 141 by a communication path configured to transmit a signal SB.

In some embodiments, as shown in FIG. 3, the LSP apparatus 131, 131' comprising a first detector 137 can comprise more than one first detector. In further embodiments, as shown the first detector can comprise a first image detector 137A configured to detect scattered light traveling along path 205S and a second image detector 137B configured to detect scattered light traveling along path 205U. In even further embodiments, the first image detector 137A can face the first output surface 213 of the prism 113 and the second image detector 137B can face the second output surface 211 of the prism 113. In even further embodiments, an angle between a first axis between the prism 113 and the first image detector 137A and a second axis between the prism 113 and the second image detector 137B can be in a range from about 85° to about 95°, from about 87° to about 93°, from about 89° to about 91° or any range or subrange therebetween. Providing multiple detectors at substantially right angles (e.g., in a range from about 85° to about 95°) can capture multiple measurements in the same polarization that can be combined (e.g., averaged) to decrease noise in the measurement and/or reduce the time needed to take the corresponding measurement.

In some embodiments, as shown in FIGS. 1-2 and 5, the LSP apparatus 131, 131' can comprise a sample holder 701. In further embodiments, as shown in FIG. 5, the sample holder 701 can at least partially define the cavity 301 configured to receive a sample 103. In further embodiments, the sample holder 701 can be translatable in a direction 305. In further embodiments, the sample holder 701 can be translatable in a direction 711. In some embodiments, as shown in FIG. 4, the LSP apparatus 131' can comprise a first stage 405 that at least a portion of the first polarization-switching light source 133 is connected to. In further embodiments, as shown, the first light source 201 of the first polarization-switching light source 133 can be connected to the first stage 405. In even further embodiments, as shown, the first light source 201 of the first polarization-switching light source 133 can be contact the first stage 405. In further embodiments, as shown, the first stage can be translatable in at least a direction 407 parallel to the first portion 205F of the first path 205 of the first polarization-switched light beam. In some embodiments, the as shown in FIG. 4, the LSP apparatus 131' can comprise a second stage 409 that at least a portion of the first detector 137 is connected to. In further embodiments, as shown, the first detector 137 can be contact the second stage 409. In further embodiments, as shown, the second stage 409 can be translatable in at least a direction 411 perpendicular to the second portion 205S of the first path of the first polarization-switched light beam after it has been scattered by the sample 103. In further embodiments, although not shown, the second stage 409 may comprise a plurality of stages with each stage of the plurality of second stages corresponding to a detector (e.g., first image detector 137A, second image detector 137B) when the first detector 137 comprises more than one detector. In even further embodiments, each stage of the plurality of stages can be translatable in at least the direction 411. It is to be understood that the translatable stages discussed above are applicable to all embodiments of an LSP apparatus 131, 131'.

In some embodiments, as shown in FIGS. 3-5, the LSP apparatus 131, 131' can comprise a second reference block 707. In further embodiments, as shown in FIG. 5, the second reference block 707 can comprise a second major surface 721 facing the specimen coupling surface 307 of the first reference block 113. In some embodiments, as shown in FIGS. 3-5, the LSP apparatus 131, 131' can comprise a platform 303. In further embodiments, as shown in FIG. 5, the platform 303 can comprise a platform surface 713 facing the specimen coupling surface 307 of the first reference block 113. In further embodiments, as shown in FIG. 5, second reference block 707 can be positioned between the platform 303 and the first reference block 113.

In some embodiments, as shown in FIG. 4, the LSP apparatus 131' can be configured so that the beam path 205 of the first polarization-switched light beam impinges on the input surface 209 of the prism 113. In further embodiments, the prism 113 can be positioned between the first polarization-switching light source 133 and the cavity 301 configured to receive the sample 103. In further embodiments, the prism 113 can positioned between the first polarization-switching light source 133 and the sample holder 701. In further embodiments, the beam path 205 can be configured to impinge on the input surface 209 of the prism 113 at a substantially normal angle of incidence (e.g., in a range from about 85° to about 95° relative to the input surface 209). In further embodiments, as discussed above and as shown in FIG. 3, the beam path can impinge on the cavity 301 configured to receive the sample 103 before impinging one or more the first output surface 213 and/or the second output surface 211 of the prism. In even further embodiments, as shown, the LSP apparatus 131' can comprise one or more detectors configured to detect a signal from the first polarization-switched light beam.

In some embodiments, as shown in FIG. 5, the LSP apparatus 131 can be configured so that the beam path 205 of the first polarization-switched light beam impinges on the sample holder 701. In further embodiments, as shown in FIG. 2, the first polarization-switching light source can be positioned at an angle 231 relative to a direction normal to the second major surface 143 of the sample holder 701. In even further embodiments, the angle 231 can be in a range from about 5° to about 25°, from about 5° to about 20°, from about 10° to about 20°, from about 10° to about 15°, or any range or subrange therebetween. In further embodiments, as shown in FIGS. 1-2 and 5, the sample holder 701 can be positioned between the first polarization-switching light source 133 and the cavity 301 configured to receive the sample 103. In some embodiments, as shown in FIG. 5, the LSP apparatus 131 can comprise a second reference block 707, where the sample holder 701 is positioned between the first polarization-switching light source 133 and the second reference block 707. In some embodiments, the beam path 205, 205S can impinge on the reference fluid 723. In further embodiments, as discussed above and as shown in FIG. 3, the beam path can impinge on the cavity 301 configured to receive the sample 103 before impinging one or more the first output surface 213 and/or the second output surface 211 of the prism. In even further embodiments, as shown, the LSP apparatus 131' can comprise one or more detectors configured to detect a signal from the first polarization-switched light beam. In some embodiments, as shown in FIGS. 1-2 and 7, this first polarization-switching light source 133 can face the second major surface 143 of the sample holder 701 opposite the first major surface 313 of the sample holder 701. In further embodiments, as shown in FIGS. 1-2, the first polarization-switching light source 133 and the second polarization-switching light source 123 can both face the second major surface 143 of the sample holder 701. In some embodiments, as shown in FIG. 2, the second detector 127 can be positioned at an angle 233 out of the plane of FIG. 2. In some embodiments, the angle 233 can be in a range from about 30° to about 60°, from about 40° to about 60°, from about 40° to about 50°, from about 42° to about 48°, from about 44° to about 46, or any range or subrange therebetween.

As shown in FIGS. 1-2, the RNF apparatus 121 can comprise a second polarization-switching light source 123. In some embodiments, as shown in FIG. 2, the second polarization-switching light source 123 can comprise a second light source 221. In further embodiments, the second light source 221 can comprise one or more of the light sources discussed above with regards to the first light source 201. In further embodiments, the second polarization-switching light source 123 can be configured to emit a second polarization-switched light beam along a second path 207, 207R. In some embodiments, the second polarization-switching light source 123 can comprise a second optical compensator 223, which can comprise one or more of the optical compensators discussed above with regards to the first optical compensator 203. In some embodiments, as shown in FIGS. 1-2 and 7, the RNF apparatus 121 can comprise a converging lens 125. In further embodiments, as shown in FIG. 7, the converging lens 125 can be configured to focus the second polarization-switched light beam passing through the converging lens 125 to form a focal point 709 at an interface between the first major surface 313 of the sample holder 701 and the cavity 301 and/or sample 103. In some embodiments, although not shown, one or more of the optical elements discussed with regards to the first focusing lens 135 (e.g., bandpass filter, additional focusing lenses, a light diffuser, a beam splitter, an attenuator) can be positioned along portion 207 of the second path. In further embodiments, one or more of these additional elements can be controlled by the controller 141. For example, in even further embodiments, a mask may be used in combination with the converging lens 125 so that a portion of a cone of light can pass through the mask to focus at the focal point 709. In even further embodiments, the mask may be configured to allow a portion of a circular cross-section of an outer periphery of the second polarization-switched light beam to pass through the mask to focus at the focal point 709. In even further embodiments, the mask can be configured to allow a few (e.g., 2) rays of light can pass through the mask to focus at the focal point 709.

In some embodiments, as shown in FIGS. 1-2 and 7, the RNF apparatus 121 can comprise a first reference block 113. In some embodiments, as shown in FIGS. 1-2, the first reference block 113 may comprise the prism 113. As discussed above with respect to the prism 113, the first reference block 113 can comprise a first output surface 213 and optionally a second output surface 211. In further embodiments, as shown in FIG. 3, the first reference block 113 can comprise a specimen coupling surface 307. In even further embodiments, as shown, the specimen coupling surface 307 of the first reference block 113 can at least partially define a cavity 301 configured to receive a sample 103. In even further embodiments, the specimen coupling surface 307 of the first reference block 113 can face an index matching fluid 215. In still further embodiments, the specimen coupling surface 307 of the first reference block 113 can contact the index matching fluid 215. In some embodiments, as shown in FIG. 1, the prism 113 and/or first reference block 113 can defined a measurement location ML. In some embodiments, although not shown, the first reference block can comprise a distinct structure from the prism, and the first reference block can be positioned between the prism and the cavity. In further embodiments, although not shown, the first major surface of the first reference block can face away from the prism. In further embodiments, although not shown, the first reference block can contact the prism. In further embodiments, although not shown, the index matching fluid can be positioned between the first reference block and the prism.

In some embodiments, the first reference block 113 can comprise a first index of refraction. The first refractive index may be a function of a wavelength of light passing through the optically clear adhesive. For light of a first wavelength, a refractive index of a material is defined as the ratio between the speed of light in a vacuum and the speed of light in the corresponding material. Without wishing to be bound by theory, a refractive index of the optically clear adhesive can be determined using a ratio of a sine of a first angle to a sine of a second angle, where light of the first wavelength is incident from air on a surface of the optically clear adhesive at the first angle and refracts at the surface of the optically clear adhesive to propagate light within the optically clear adhesive at a second angle. The first angle and the second angle are both measured relative to a normal of a surface of the optically clear adhesive. In some embodiments, the first refractive index of the first reference block 113 may be about 1 or more, about 1.3 or more, about 1.4 or more, about 3 or less, about 2 or less, or about 1.7 or less. In some embodiments, the first refractive index of the first reference block 113 can be in a range from about 1 to about 3, from about 1 to about 2 from about 1 to about 1.7, from about 1.3 to about 3, from about 1.3 to about 2, from about 1.3 to about 1.7, from about 1.4 to about 2, from about 1.4 to about 1.7, or any range or subrange therebetween.

In some embodiments, as shown in FIG. 7, the RNF apparatus 121 can comprise a second reference block 707, as shown in dashed lines. In further embodiments, the second reference block 707 can comprise a second major surface 721 facing the specimen coupling surface 307 of the first reference block 113. In even further embodiments, the second major surface 721 of the second reference block 707 can at least partially define the cavity 301 configured to receive the sample 103.

In some embodiments, the second reference block 707 can comprise a second refractive index. In further embodiments, the second refractive index can be within the ranges discussed above. In further embodiments, the second refractive index can be substantially equal to the first refractive index. In even further embodiments, the first reference block and the second reference block may comprise the same material. In further embodiments, the first refractive index can be greater than the second refractive index. In further embodiments, the second refractive index can be greater than the first refractive index. In further embodiments, a differential equal to the absolute value (e.g., magnitude) between the first refractive index and the second refractive index can be can be about 0.1 or less, about 0.07 or less, about 0.05 or less, about 0.001 or more, about 0.006 or more, about 0.01 or more, or about 0.02 or more. In some embodiments, the differential is in a range from about 0.001 to about 0.1, from about 0.001 to about 0.07, from about 0.001 to about 0.05, from about 0.001 to about 0.1, from about 0.006 to about 0.07, from about 0.006 to about 0.05, from about 0.01 to about 0.1, from about 0.01 to about 0.07, from about 0.01 to about 0.05, from about 0.02 to about 0.1, from about 0.02 to about 0.07, from about 0.02 to about 0.05, or any range or subrange therebetween.

In some embodiments, as schematically shown in FIG. 7, the RNF apparatus 121 can comprise a fluid 723. In further embodiments, as shown, the fluid 723 can contact the prism 113. In further embodiments, as shown, the fluid 723 can contact the first reference block 113. In some embodiments, the fluid 723 can comprise a third refractive index. In further embodiments, the third refractive index is greater than the first refractive index. In further embodiments, the first refractive index is greater than the second refractive index. In further embodiments, although not shown, the fluid 723 can be positioned between the first reference block 113 and the cavity 301 configured to the receive the sample 103. In further embodiments, although not shown, the fluid 723 can be positioned between the second reference block 707 and the cavity 301 configured to receive the sample 103. In further embodiments, although not shown, the fluid 723 can be positioned between the first reference block 113 and the second reference block 707. In further embodiments, as shown, the fluid 723 can contact the sample holder 701. In further embodiments, spacers (e.g., glass strips) can be positioned between the cavity 301 configured to receive the sample 103 and one or both of the first reference block 113 and/or the second reference block 707, where the thickness of the spacers defines a region comprising a thickness is a range from about 10 µm to about 1 millimeter, from about 25 µm to about 500 µm, from about 50 µm to about 300 µm, from about 100 µm to about 200 µm, or any range or subrange therebetween. In some embodiments, although not shown, the fluid 723 may not extend past the first reference block 213 in the x-direction. In some embodiments, although not shown, the fluid 723 may not extend past the first reference block 213 in the z-direction. In some embodiments, although not shown, the fluid 723 may not extend past the first reference block 213 in the y-direction.

In further embodiments, a differential equal to the absolute value between the third refractive index and the first refractive index can be in a range from about 0.05 or more, about 0.06 or more, about 0.08 or more, about 0.10 or more, about 0.12 or more, or about 0.14 or more. In further embodiments, a differential equal to the absolute value between the third refractive index and the first refractive index can be in a range from about 0.05 to about 0.20, from about 0.04 to about 0.18, from about 0.06 to about 0.15, from about 0.08 to about 0.10, or any range or subrange therebetween.

As shown in FIGS. 1-2 and 7, the RNF apparatus 121 can comprise a second detector 127. In some embodiments, the second detector 127 can comprise a digital camera, a CCD, and/or an array of photodetectors. In some embodiments, the second detector 127 may comprise one or more focusing lenses, an attenuator, and/or a beam splitter. In some embodiments, as shown in FIGS. 2 and 7, the second detector 127 can comprise an image sensor 219. In further embodiments, although not shown, image sensor 219 can comprise similar or the same attributes as image sensor 217 discussed above. In further embodiments, as shown in FIGS. 2 and 7, the second detector 127 can face the prism 113. In further embodiments, the second detector 127 can be positioned along the second path 207R to detect a signal from the refracted second polarization-switched light beam that traveled through the prism 113. In further embodiments, as shown in FIGS. 2 and 7, the second detector 127 can face the second reference block 707. In further embodiments, the second detector 127 can be positioned along the second path 207R to detect a signal from the refracted second polarization-switched light beam that traveled through the second reference block 707. As shown in FIGS. 1-2 and 7, the second detector 127 can be connected to the controller 141 by a communication path configured to transmit a signal SA.

In some embodiments, as shown in FIG. 7, the RNF apparatus 121 can comprise a sample holder 701. In further embodiments, as shown, the sample holder 701 can contact the fluid 723. In further embodiments, as shown, the sample holder 701 can contact the first reference block 113. In even further embodiments, as shown, the sample holder 701 can at least partially define the cavity 301 configured to receive a sample 103. In further embodiments, the sample holder 701 can contact the second reference block 707. In further embodiments, the sample holder 701 can be translatable in a direction 305 perpendicular to the specimen coupling surface 307 of the first reference block 113. In further embodiments, the sample holder 701 can be translatable in a direction 711 (shown as out of the page in FIG. 7) parallel to the specimen coupling surface 307 of the first reference block 113. In some embodiments, for example in the combined apparatus 101, the sample holder 701 discussed with regards to FIGS. 3-4 can be the same sample holder 701 discussed with regards to FIG. 7. In some embodiments, as shown in FIG. 7, the RNF apparatus 121 can comprise a platform 303. In further embodiments, as shown, the platform 303 can comprise a platform surface 713 facing the specimen coupling surface 307 of the first reference block 113. In further embodiments, as shown in FIG. 5, second reference block 707 can be positioned between the platform 303 and the first reference block 113.

In some embodiments, as shown in FIG. 7, the cavity 301 can be positioned between the first reference block 113 and the second reference block 707. In some embodiments, as shown, the sample holder 701 can be positioned between the second polarization-switching light source 123 and the cavity 301 configured to receive the sample 103. In some embodiments, as shown, the sample holder 701 can be positioned between the second polarization-switching light source 123 and the first reference block 113. In some embodiments, as shown, the sample holder 701 can be positioned between the second polarization-switching light source 123 and the fluid 723. In some embodiments, as shown, the sample holder 701 can be positioned between the second polarization-switching light source 123 and the second reference block 707. In some embodiments, as shown, the second path 207 of the second polarization-switched light beam emitted from the second polarization-switching light source 123 can imping the first reference block 113 and the second reference block 707.

As used herein, the term "controller" can encompass all apparatus, devices, and machines for processing data, including by way of example a programmable processor, a computer, or multiple processors or computers. The processor can include, in addition to hardware, code that creates an execution environment for the computer program in question, e.g., code that constitutes processor firmware, a protocol stack, a database management system, an operating system, or a combination of one or more of them. In some embodiments, the controller can comprise and/or be implemented in digital electronic circuitry, or in computer software, firmware, or hardware, including the structures disclosed in this specification and their structural equivalents, or in combinations of one or more of them. Embodiments of controllers described herein can be implemented as one or more computer program products (e.g., one or more modules of computer program instructions encoded on a tangible program carrier for execution by, or to control the operation of, data processing apparatus). The tangible program carrier can be a computer-readable medium. The computer-readable medium can be a machine-readable storage device, a machine-readable storage substrate, a memory device, or a combination of one or more of them. A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes described herein can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit) to name a few. Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more data memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), to name just a few. Computer-readable media suitable for storing computer program instructions and data include all forms of data memory including nonvolatile memory, media and memory devices, including by way of example semiconductor memory devices, e.g., EPROM, EEPROM, and flash memory devices; magnetic disks, e.g., internal hard disks or removable disks; magneto-optical disks; and CD ROM and DVD-ROM disks. The processor and the memory can be supplemented by, or incorporated in, special purpose logic circuitry. To provide for interaction with a user, embodiments described herein can be implemented on a computer having a display device, e.g., a CRT (cathode ray tube) or LCD (liquid crystal display) monitor, and the like for displaying information to the user and a keyboard and a pointing device, e.g., a mouse or a trackball, or a touch screen by which the user can provide input to the computer. Other kinds of devices can be used to provide for interaction with a user as well; for example, input from the user can be received in any form, including acoustic, speech, or tactile input. Embodiments described herein can be implemented in a computing system that includes a back-end component, e.g., as a data server, or that includes a middleware component, e.g., an application server, or that includes a front-end component, e.g., a client computer having a graphical user interface or a Web browser through which a user can interact with implementations of the subject matter described herein, or any combination of one or more such back-end, middleware, or front-end components. The components of the system can be interconnected by any form or medium of digital data communication, e.g., a communication network. Embodiments of communication networks include a local area network ("LAN") and a wide area network ("WAN"), e.g., the Internet. The computing system can include clients and servers. A client and server are generally remote from each other and typically interact through a communication network. The relationship of client and server arises from computer programs running on the respective computers and having a client-server relationship to each other.

In some embodiments, the combined apparatus 101, the LSP apparatus 131, and/or the RNF apparatus 121 can be used to measure a refractive index, a stress profile, and/or a central tension of a sample 103. In some embodiments, the sample 103 can comprise a glass-based sample. As used herein, "glass-based" includes both glasses and glass-ceramics, wherein glass-ceramics have one or more crystalline phases and an amorphous, residual glass phase. Glass-based material cool or has already cooled into a glass, glass-ceramic, and/or that upon further processing becomes a glass-ceramic material. A glass-based material (e.g., glass-based substrate) may comprise an amorphous material (e.g., glass) and optionally one or more crystalline materials (e.g., ceramic). Amorphous materials and glass-based materials may be strengthened. As used herein, the term "strengthened" may refer to a material that has been chemically strengthened, for example, through ion-exchange of larger ions for smaller ions in the surface of the substrate, as discussed below. However, other strengthening methods known in the art, for example, thermal tempering, or utilizing a mismatch of the coefficient of thermal expansion between portions of the substrate to create compressive stress and central tension regions, may be utilized to form strengthened substrates. Exemplary glass-based materials, which may be free of lithia or not, comprise soda lime glass, alkali aluminosilicate glass, alkali-containing borosilicate glass, alkali-containing aluminoborosilicate glass, alkali-containing phosphosilicate glass, and alkali-containing aluminophosphosilicate glass. In one or more embodiments, a glass-based material may comprise, in mole percent (mol %): $SiO_2$ in a range from about 40 mol % to about 80%, $Al_2O_3$ in a range from about 10 mol % to about 30 mol %, $B_2O_3$ in a range from 0 mol % to about 10 mol %, $ZrO_2$ in a range from 0 mol % to about 5 mol %, $P_2O_5$ in a range from 0 mol % to about 15 mol %, $TiO_2$ in a range from 0 mol % to about 2 mol %, $R_2O$ in a range from 0 mol % to about 20 mol %, and RO in a range from 0 mol % to about 15 mol %. As used herein, $R_2O$ can refer to an alkali metal oxide, for example, $Li_2O$, $Na_2O$, $K_2O$, $Rb_2O$, and $Cs_2O$. As used herein, RO can refer to MgO, CaO, SrO, BaO, and ZnO. In some embodiments, a glass-based substrate may optionally further comprise in a range from 0 mol % to about 2 mol % of each of $Na_2SO_4$, NaCl, NaF, NaBr, $K_2SO_4$, KCl, KF, KBr, $As_2O_3$, $Sb_2O_3$, $SnO_2$, $Fe_2O_3$, MnO, $MnO_2$, $MnO_3$, $Mn_2O_3$, $Mn_3O_4$, $Mn_2O_7$. "Glass-ceramics" include materials produced through controlled crystallization of glass. In some embodiments, glass-ceramics have about 1% to about 99% crystallinity. Examples of suitable glass-ceramics may include $Li_2O$—$Al_2O_3$—$SiO_2$ system (i.e. LAS-System) glass-ceramics, MgO—$Al_2O_3$—$SiO_2$ system (i.e. MAS-System) glass-ceramics, $ZnO \times Al_2O_3 \times nSiO_2$ (i.e. ZAS system), and/or glass-ceramics that include a predominant crystal phase including β-quartz solid solution, β-spodumene, cordierite, petalite, and/or lithium disilicate. The glass-ceramic substrates may be strengthened using the strengthening processes described herein. In one or more embodiments, MAS-System glass-ceramic substrates may be strengthened in $Li_2SO_4$ molten salt, whereby an exchange of $2Li^+$ for $Mg^{2+}$ can occur. In some embodiments, the substrate comprising the glass-based substrate can be optically transparent. As used herein, "optically transparent" or "optically clear" means an average transmittance of 70% or more in the wavelength range of 400 nm to 700 nm through a 1.0 mm thick piece of a material. In some embodiments, an "optically transparent material" or an "optically clear material" may have an average transmittance of 75% or more, 80% or more, 85% or more, or 90% or more, 92% or more, 94% or more, 96% or more in the wavelength range of 400 nm to 700 nm through a 1.0 mm thick piece of the material. The average transmittance in the wavelength range of 400 nm to 700 nm is calculated by measuring the transmittance of whole number wavelengths from about 400 nm to about 700 nm and averaging the measurements.

Figure 6:
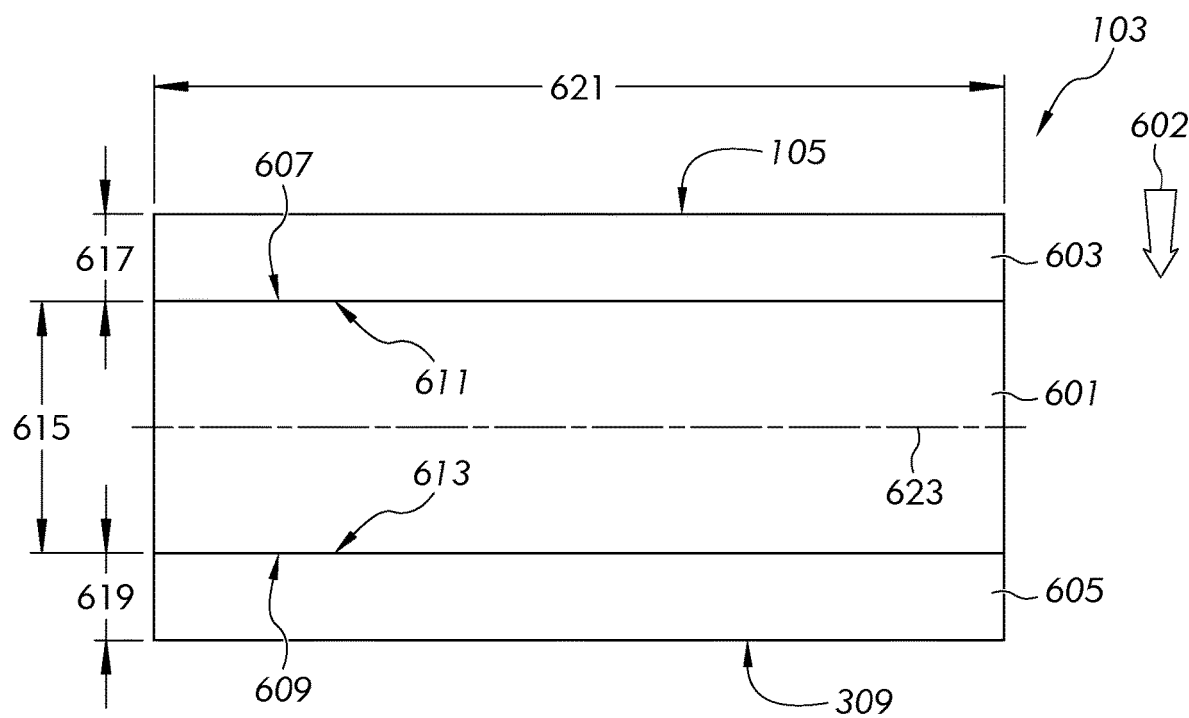
FIG. 6 is a cross-sectional view of a sample comprising a laminate according to some embodiments.

As shown in FIG. 6, the sample 103 can comprise a length 621 and a width perpendicular to the length. In some embodiments, the dimensions (e.g., length 621, width) of the sample may correspond to the dimension of a consumer electronic product. In some embodiments, the sample 103 can comprise a consumer electronic product. The consumer electronic product can comprise a glass-based portion and further comprise electrical components at least partially within a housing. The electrical components can comprise a controller, a memory, and a display. A display can be at or adjacent the front surface of the housing. The consumer electronic product can comprise a cover substrate disposed over the display.

In some embodiments, as shown in FIG. 6, the sample 103 can comprise a laminate. As used herein, a laminate comprises a core layer positioned between a first outer layer and a second outer layer. For example, with reference to FIG. 6, the sample 103 can comprise a laminate comprising a core layer 601 positioned between a first outer layer 603 and a second outer layer 605. In further embodiments, the core layer 601 can comprise a central tension (e.g., comprise a region in tension). In further embodiments, the first outer layer 603 and/or the second outer layer 605 can comprise a compressive stress (e.g., comprise a region in compression). In further embodiments, the core layer 601 can comprise a core thickness 615 that can be greater than the sum of the first thickness 617 of the first outer layer 603 and the second thickness 619 of the second outer layer 605.

In some embodiments, the first outer layer 603 and/or the second outer layer 605 can be glass-based. In some embodiments, the core layer 601 can be glass-based. In some embodiments, the core thickness 615 of the core layer 601 can be about 100 μm or more, about 200 μm or more, about 400 μm or more, about 10 millimeters (mm) or less, about 5 mm or less, about 2 mm or less, or about 1 mm or less. In some embodiments, the core thickness 615 of the core layer 601 can be in a range from about 100 μm to about 10 mm, from about 200 μm to about 5 mm, from about 400 μm to about 2 mm, from about 400 μm to about 1 mm, or any range or subrange there between. In some embodiments, the first thickness 617 of the first outer layer 603 and/or the second thickness 619 of the second outer layer 605 can be about 1 μm or more, about 10 μm or more about 20 μm or more, about 200 μm or less, about 100 μm or less, or about 60 μm or less. In some embodiments, the first thickness 617 of the first outer layer 603 and/or the second thickness 619 of the second outer layer 605 can be in a range from about 1 μm to about 200 μm, from about 10 μm to about 100 μm, from about 20 μm to about 60 μm, or any range or subrange therebetween.

In some embodiments, the sample 103 can comprise a first outer major surface 105 and a second outer major surface 309 opposite the first outer major surface 105. In further embodiments, the sample 103 can comprise a laminate and the core layer 601 can comprise a first inner major surface 607 and a second inner major surface 609 opposite the first inner major surface 607. In even further embodiments, a third inner major surface 611 of the first outer layer 603 can face the first inner major surface 607 of the core layer 601. In still further embodiments, the third inner major surface 611 of the first outer layer 603 can contact the first inner major surface 607 of the core layer 601. In even further embodiments, a fourth inner major surface 613 of the second outer layer 605 can face the second inner major surface 609 of the core layer 601. In still further embodiments, the fourth inner major surface 613 of the second outer layer 605 can contact the second inner major surface 609.

In some embodiments, the sample 103 can be positioned in the cavity 301. In further embodiments, the first outer major surface 105 of the sample 103 can face the first major surface 313 of the sample holder 701. In further embodiments, the second outer major surface 309 of the sample 103 can face the first major surface 313 of the sample holder. In further embodiments, the first outer major surface 105 of the sample 103 can face the specimen coupling surface 307 of the prism 113 and/or first reference block 113. In further embodiments, the second outer major surface 309 of the sample 103 can face the second major surface 721 of the second reference block 707.

In some embodiments, the sample 103 can comprise a sample refractive index. In further embodiments, the sample refractive index can comprise a refractive index profile that varies in a direction 602 perpendicular to the first outer major surface 105. As used herein, a magnitude of a minimum difference between a first refractive index and a refractive index profile is the smallest absolute value of a difference between the first refractive index and each point in the refractive index profile. In practice, the magnitude of the minimum difference is equal to the smaller of (i) the absolute value of the difference between the first refractive index and the minimum refractive index of the refractive index profile and (ii) the absolute value of the difference between the first refractive index and the maximum refractive index of the refractive index profile. As used herein, the magnitude of the minimum difference expressed as a percentage is the magnitude of the minimum difference divided by the value of the refractive index profile that was used to produce the magnitude of the minimum difference.

In some embodiments, a magnitude of a minimum difference between the sample refractive index of the sample 103 and the first refractive index of the first reference block 113 as a percentage of the sample refractive index can be about 0.7% or more, about 1% or more, about 2% or more, 3% or more about 5% or more, about 10% or less, about 8% or less, or about 6% or less, or about 4% or less. In some embodiments, a magnitude of a minimum difference between the sample refractive index of the sample 103 and the first refractive index of the first reference block 113 as a percentage of the sample refractive index can be in a range from about 0.7% to about 10%, from about 0.7% to about 8%, from about 0.7% to about 6%, from about 0.7% to about 4%, from about 1% to about 10%, from about 1% to about 8%, from about 1% to about 6%, from about 2% to about 10%, from about 2% to about 8%, from about 2% to about 6%, from about 3% to about 8%, from about 3% to about 6%, from about 5% to about 10%, from about 5% to about 8%, from about 5% to about 6%, or any range or subrange therebetween. In some embodiments, a magnitude of a minimum difference between the sample refractive index of the sample 103 and the first refractive index of the first reference block 113 can be about 0.006 or more, about 0.01 or more, 0.02 or more, about 0.04 or more, about 0.06 or more, about 0.10 or less, about 0.08 or less, or about 0.06 or less. In some embodiments, a magnitude of a minimum difference between the sample refractive index of the sample 103 and the first refractive index of the first reference block 113 can be in a range from about 0.006 to about 0.10, from about 0.006 to about 0.08, from about 0.006 to about 0.06, from about 0.02 to about 0.10, from about 0.02 to about 0.08, from about 0.02 to about 0.06, from about 0.04 to about 0.10, from about 0.04 to about 0.08, from about 0.04 to about 0.06, from about 0.06 to about 0.10, from about 0.06 to about 0.08, or any range or subrange therebetween. In some embodiments, the first refractive index of the first reference block 113 can be greater than the sample refractive index (e.g., the first refractive index can be greater than substantially all the points in a refractive index profile of the sample) of the sample 103. In some embodiments, the first refractive index of the first reference block 113 can be less than the sample refractive index (e.g., the first refractive index can be less than substantially all the points in a refractive index profile of the sample) of the sample 103. In some embodiments, the second refractive index of the second reference block 707 can be greater than the sample refractive index (e.g., the second refractive index can be greater than substantially all the points in a refractive index profile of the sample) of the sample 103. In some embodiments, the second refractive index of the second reference block 707 can be less than the sample refractive index (e.g., the second refractive index can be less than substantially all the points in a refractive index profile of the sample) of the sample 103.

In some embodiments, a magnitude of a minimum difference between the sample refractive index of the sample 103 and the third refractive index of the fluid 723 as a percentage of the sample refractive index can be about 0.7% or more, about 1% or more, about 2% or more, about 3% or more about 5% or more, about 10% or less, about 8% or less, or about 6% or less. In some embodiments, a magnitude of a minimum difference between the sample refractive index of the sample 103 and the third refractive index of the fluid 723 as a percentage of the sample refractive index can be in a range from about 0.7% to about 10%, from about 0.7% to about 8%, from about 0.7% to about 6%, from about 0.7% to about 4%, from about 1% to about 10%, from about 1% to about 8%, from about 1% to about 6%, from about 2% to about 10%, from about 2% to about 8%, from about 2% to about 6%, from about 3% to about 8%, from about 3% to about 6%, from about 5% to about 10%, from about 5% to about 8%, from about 5% to about 6%, or any range or subrange therebetween. In some embodiments, a magnitude of a minimum difference between the sample refractive index of the sample 103 and the third refractive index of the fluid 723 can be about 0.006 or more, about 0.01 or more, about 0.02 or more, about 0.04 or more, about 0.06 or more, about 0.10 or less, about 0.08 or less, or about 0.06 or less. In some embodiments, a magnitude of a minimum difference between the sample refractive index of the sample 103 and the third refractive index of the fluid 723 can be in a range from about 0.006 to about 0.10, from about 0.006 to about 0.08, from about 0.006 to about 0.06, from about 0.02 to about 0.10, from about 0.02 to about 0.08, from about 0.02 to about 0.06, from about 0.04 to about 0.10, from about 0.04 to about 0.08, from about 0.04 to about 0.06, from about 0.06 to about 0.10, from about 0.06 to about 0.08, or any range or subrange therebetween.

Figure 14:
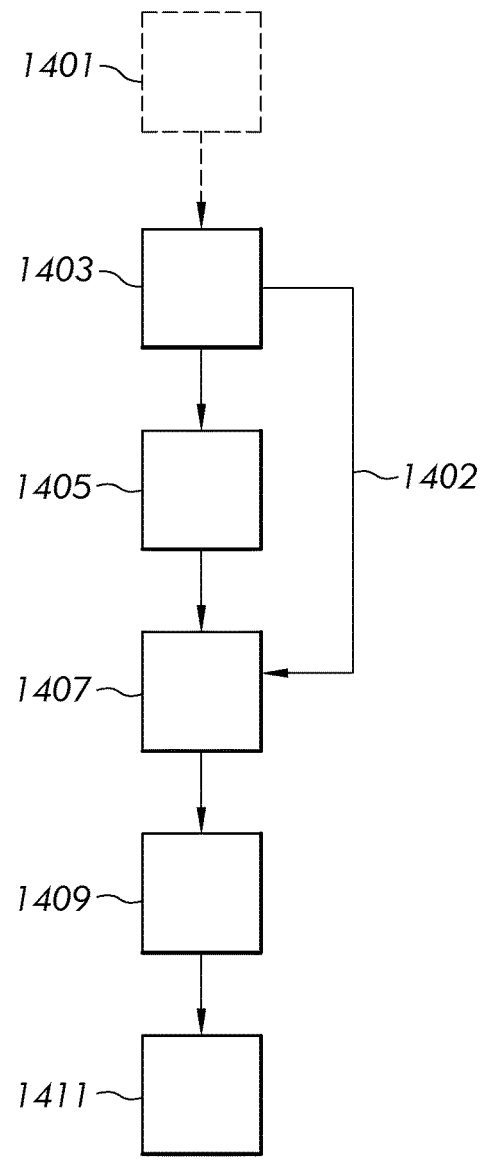
FIG. 14 is a flow chart illustrating example methods of measuring a central tension in accordance with the embodiments of the disclosure.
Figure 15:
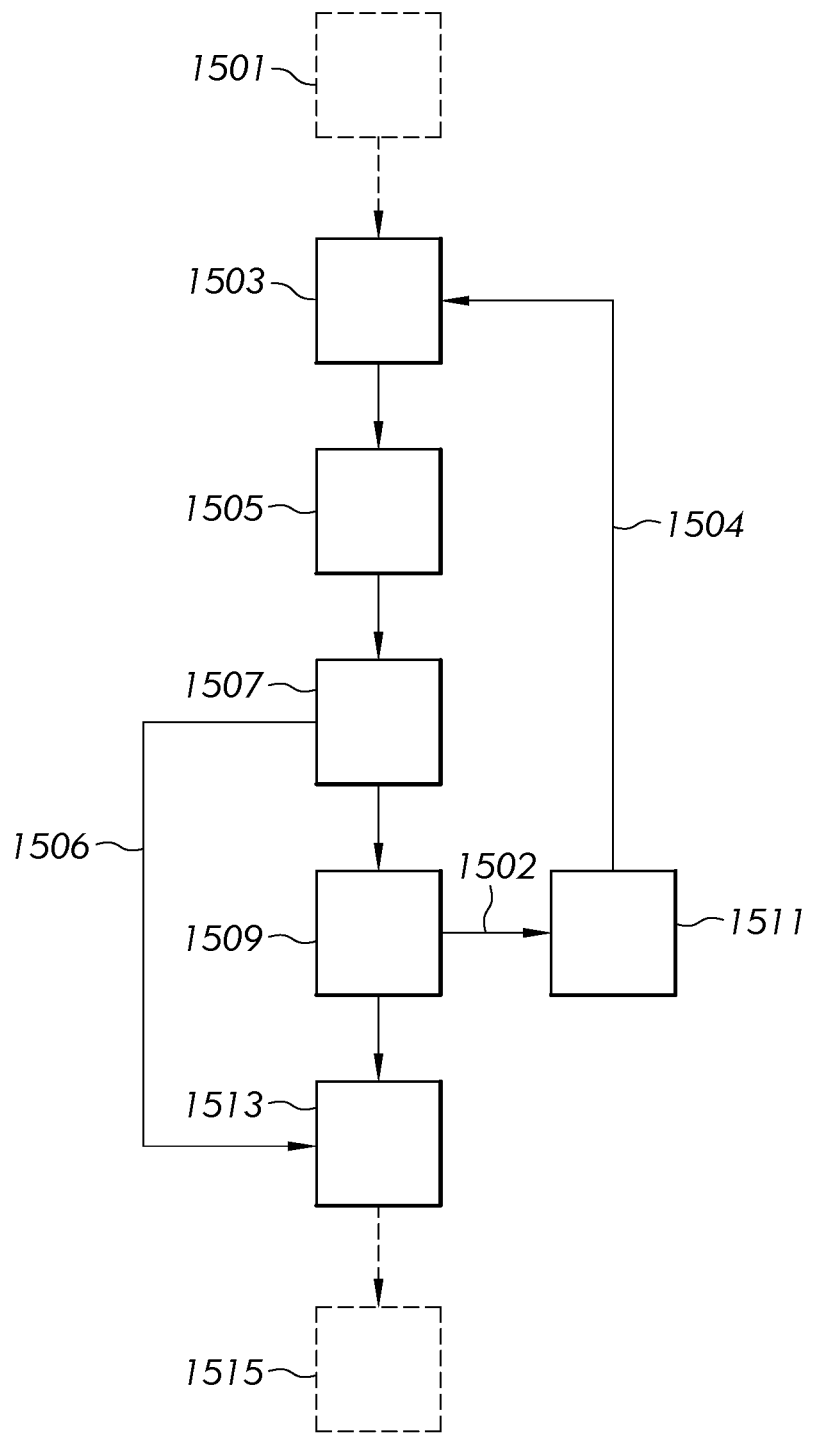
FIG. 15 is a flow chart illustrating example methods of measuring a refractive index and/or stress profile in accordance with the embodiments of the disclosure.

Embodiments of methods of determining a stress profile of a sample in accordance with the embodiments of the disclosure will be discussed with reference to the flow charts in FIGS. 13-15.

In a first step 1301 of methods of determining a stress profile of a sample, methods can start with providing a sample 103. In some embodiments, the sample 103 may be provided by purchase or otherwise obtaining a sample or by forming the sample using methods known in the art. In further embodiments, glass-based samples or layers of glass-based samples can be provided by forming them with a variety of ribbon forming processes, for example, slot draw, down-draw, fusion down-draw, up-draw, press roll, redraw or float. In some embodiments, the sample 103 can comprise a glass-based sample. In some embodiments, the sample 103 can comprise a laminate comprising a core layer 601 positioned between a first outer layer 603 and a second outer layer 605, as shown in FIG. 6. In further embodiments, the core layer 601 can comprise a central tension. In further embodiments, the sample 103 can comprise a first outer major surface 105 and a second outer major surface 309 opposite the first outer major surface 105.

After step 1301, the method can proceed to step 1303 comprising positioning the sample 103 within the cavity 301 of the apparatus (e.g., combined apparatus 101, RNF apparatus 121, LSP apparatus 131, 131'). In some embodiments, as shown in FIGS. 3-4 and 7, the sample 103 may be secured by sample holder 701. In some embodiments, as shown in FIG. 7, the sample 103 may contact a specimen coupling surface 307 of the first reference block 113 comprising a first refractive index. In further embodiments, the sample 103 may contact a second major surface 721 of a second reference block 707 comprising a second refractive index. In further embodiments, the second refractive index can be substantially equal to the first refractive index. In further embodiments, the sample 103 can be positioned within the cavity 301 by placing the sample 103 on the second major surface 721 of the second reference block 707 and then placing the specimen coupling surface 307 of the first reference block 113 on the sample 103. In some embodiments, as shown in FIG. 7, a fluid 723 comprising a third refractive index can contact the first reference block 113. In further embodiments, as shown, the fluid 723 can contact the second reference block 707. In further embodiments, as shown, the fluid 723 can contact the sample 103. In some embodiments, as shown in FIG. 7, the cavity 301 can be at least partially defined by the specimen coupling surface 307 of the first reference block 113. In further embodiments, as shown, the cavity 301 can be further defined by the second major surface 721 of the second reference block 707. In even further embodiments, as shown, the cavity 301 can be further defined by the sample holder 701.

After step 1303, the method can proceed to step 1305 comprising measuring a retardation profile of the sample and determining a central tension of the sample from the measured retardation profile of the sample. In some embodiments, step 1305 can comprise a series of steps that will be discussed with reference to the flow chart in FIG. 14. In some embodiments, step 1305 can comprise steps 1403, 1405, 1407, 1409, and 1411. In some embodiments, step 1305 can omit step 1405 by following arrow 1402 so that step 1305 comprises steps 1403, 1407, 1409, and 1411.

In some embodiments, step 1305 can comprise step 1403 comprising measuring a retardation profile of the sample 103. In some embodiments, a first polarization-switched light beam can be emitted from the first polarization-switching light source 133 can configured to travel along the first path 205, 205F, 205R. In some embodiments, as shown in FIGS. 1-5, the first polarization-switched light beam can impinge on (e.g., be transmitted through) a first focusing lens 135 and/or other optical elements discussed with respect to the first focusing lens and/or the first path 205, 205F above. In some embodiments, as shown in FIGS. 1-5, the first polarization-switched light beam can impinge on (e.g., be transmitted through) the prism 113. In further embodiments, as shown in FIG. 4, the first polarization-switched light beam can impinge on the input surface 209 of the prism 113. In further embodiments, the first polarization-switched light beam can impinge on the specimen coupling surface 307 of the prism 113. In some embodiments, the first path can impinge on the input surface 209 of the prism 113 and the specimen coupling surface 307 of the prism 113. In some embodiments, as shown in FIG. 5, the first polarization-switched light beam can impinge on the sample holder 701. In some embodiments, the first polarization-switched light beam can impinge on the index matching fluid 215. In some embodiments, the first path 205F and the first polarization-switched light beam can impinge on the first outer major surface 105 of the sample. In further embodiments, as shown in FIG. 6, the sample 103 can comprise a laminate comprising a core layer 601 positioned between a first outer layer 603 and a second outer layer 605. In even further embodiments, the core layer 601 can comprise the central tension. In even further embodiments, as shown the first path 205F and the first polarization-switched light beam can impinge on the first outer layer 603. In still further embodiments, the first path 205F and the first polarization-switched light beam can impinge on the core layer 601. In yet further embodiments, the first path 205F and the first polarization-switched light beam can impinge on the second outer layer 605. In some embodiments, the first path 205R, 205S and a scattered first polarization-switched light beam that has been transmitted through the sample 103 can impinge on the prism 113 and the first output surface 213 and/or second output surface 211 of the prism 113. In some embodiments, a first detector 137 can detect a signal from the first polarization-switched light beam comprising the scattered first polarization-switched light beam. In further embodiments, as shown in FIG. 3, the first detector 137 can comprise a first image detector 137A and a second image detector 137B that can each detect a signal from the first polarization-switched light beam. In some embodiments, the detected signal can comprise one or more line images comprising an intensity distribution. In some embodiments, the detected signal can be converted into a signal SB that is sent to the controller 141. In further embodiments, the first image detector 137A can send a signal SB to the controller 141 and the second image detector 137B can send a second signal SB' to the controller. In some embodiments, the controller 141 can determine a retardation profile from the signal. As used herein, the retardation profile means an amount of optical retardation of the signal as a function of the depth that the first polarization-switched light beam traveled into the sample 103 in a direction 602. As used herein, the optical retardation means a phase shift between two orthogonal light polarizations, which can be measured in radians (rad) or nanometers (nm). Without wishing to be bound by theory, the amount of optical retardation can be determined from the detected signal, which varies due to the constructive and destructive interference for the different effective path lengths of the detected signal through the sample. Without wishing to be bound by theory, stress in the sample can cause optical retardation along the first path of the first polarization-switched light beam, with the amount of stress encountered being proportional to the derivative of the optical retardation. In some embodiments, one or more of the sample holder 701, the first stage 405, and the second stage 409 can be translated while transmitting the first polarization-switched light beam through the sample and/or detecting the transmitted first polarization-switched light beam. In some embodiments, multiple measurements corresponding to multiple detected signals may be combined (e.g., averaged) to produce a composite detected signal. In further embodiments, the sample holder 701 can be translated in direction 305 while measuring the retardation profile of the sample 103.

Figure 8:
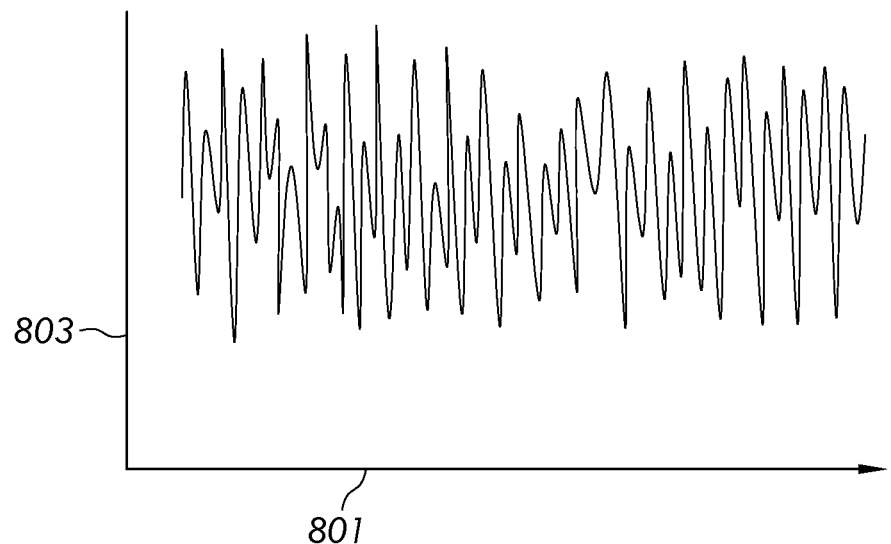
FIG. 8 is a schematic representation of an intensity distribution measured using light-scattered polarimetry in accordance with the embodiments of the disclosure.
Figure 9:
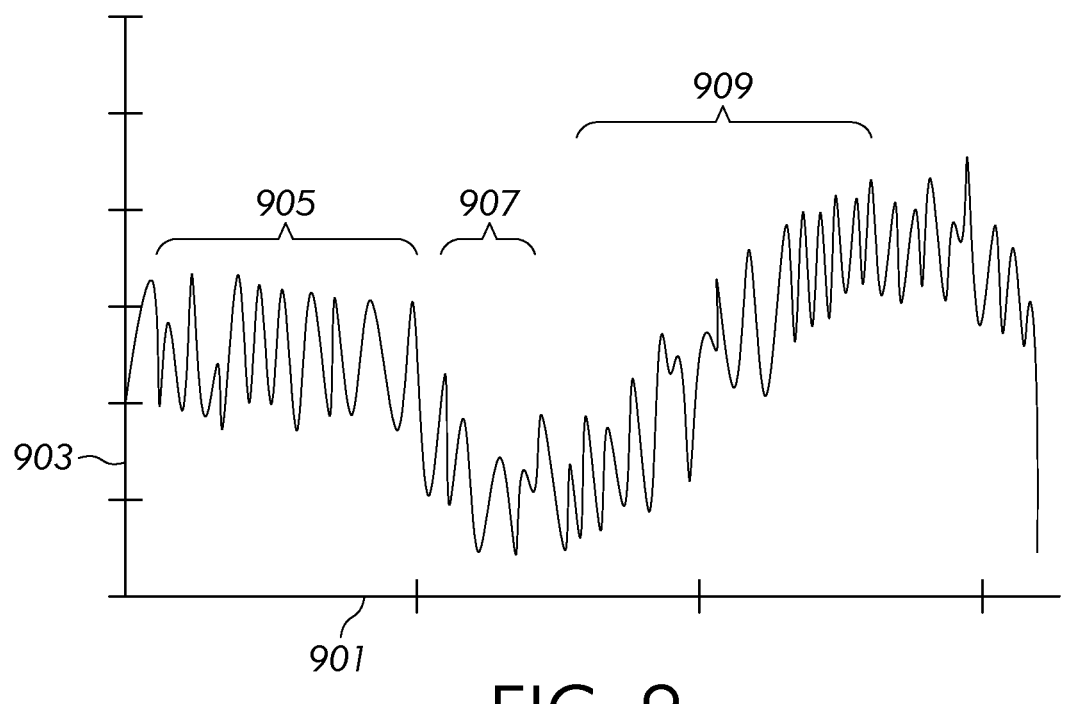
FIG. 9 is a schematic representation of an optical retardation profile measured using light-scattered polarimetry in accordance with the embodiments of the disclosure.

In some embodiments, the signal SB can resemble the intensity profile shown in FIG. 8, where the horizontal axis 801 is a distance in a direction and the vertical axis 803 is the intensity of the detected signal. In some embodiments, the optical retardation profile can resemble the optical retardation profile shown in FIG. 9, where the horizontal axis 901 is distance in direction 602 and the vertical axis 903 is optical retardation shown in length units (e.g., nm). In some embodiments, the optical retardation profile can comprise a reference region 905, a compressive region 907, and a tensile region 909.

After step 1403, step 1305 can further comprise step 1405 comprising determining a width of a central region comprising the central tension. In some embodiments, the width of the central region can be determined based on the locations where the derivative of the measured retardation profile is substantially 0. As used herein, the width of the central region is the minimum distance between two locations where the derivative of the retardation profile is substantially zero and the locations comprise a pair of opposite extrema (e.g., a minima and a maxima) of the measured retardation profile. In some embodiments, the sample can comprise a laminate. In further embodiments, the width of the central region can be substantially equal to the core thickness 615 of the core layer 601 comprising the central tension. In some embodiments, multiple measured retardation profiles can be combined (e.g., averaged) and used to produce a lower noise retardation profile and width of the central region.

Figure 10:
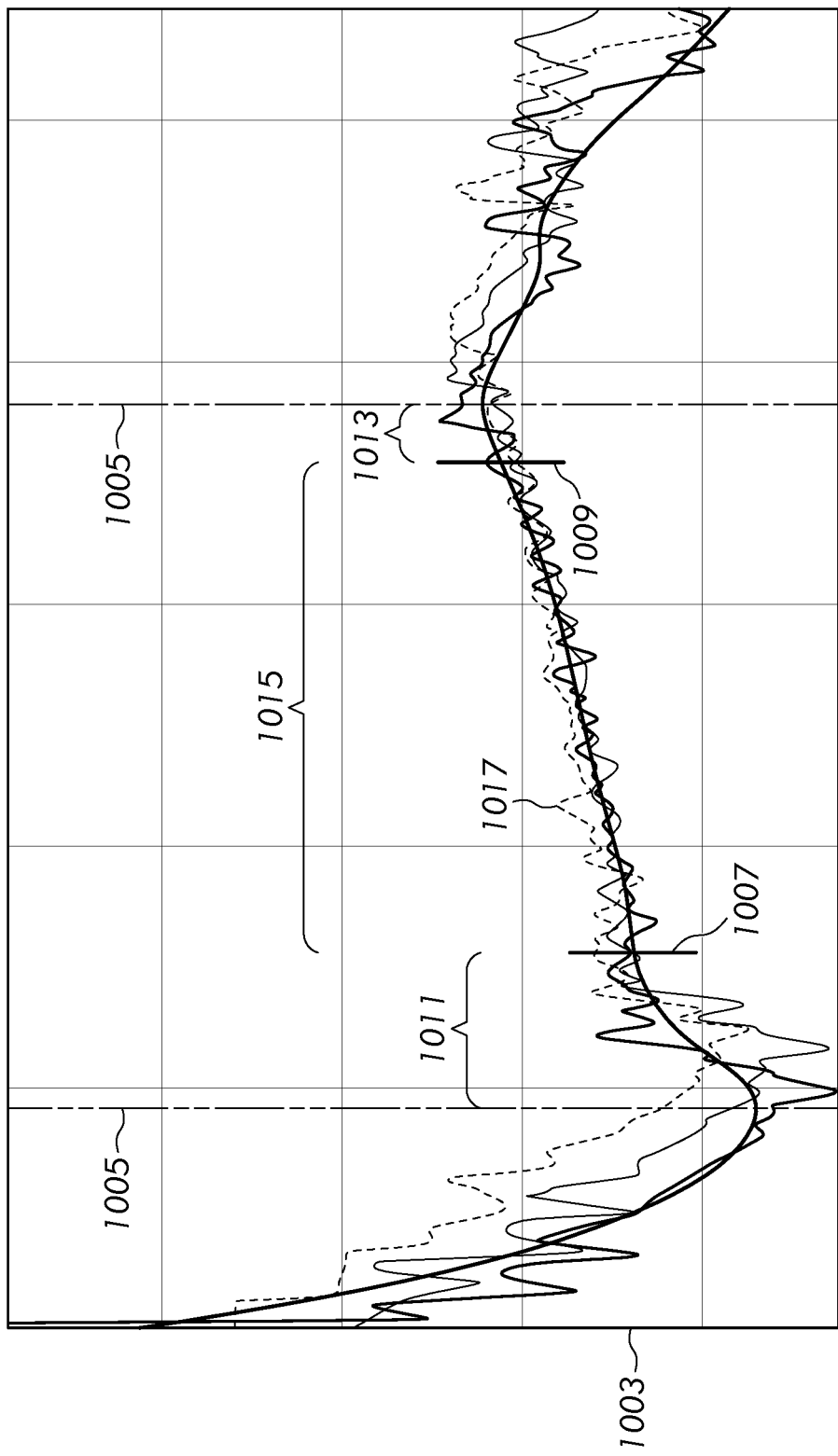
FIG. 10 is an example optical retardation profile measured using light scattered polarimetry in accordance with the embodiments of the disclosure.

For example, FIG. 10 shows an experimental optical retardation profile 1017, where the horizontal axis 1001 is distance in direction 602 and the vertical axis 1003 is optical retardation shown in length units (e.g., nm). As shown, multiple measured retardation profiles can be combined to reduce noise in the retardation profile. In FIG. 10, the central region has been demarcated by lines 1005. One line 1005 is located at a minima while the other line 1005 is located at a maxima of the retardation profile. The width of the central region can be determined as the distance between the two lines 1005 demarcating the central region comprising the central tension.

After step 1405 or after step 1403 following arrow 1402, step 1305 can further comprise step 1407 of determining a fitting range comprising a fitting width. In some embodiments, the fitting width can be less than the width of the central portion. In further embodiments, the fitting width can exclude one or more end portions of the retardation profile. In even further embodiments, the one or more end portions of the retardation profile excluded may comprise a portion of the central region. Without wishing to be bound by theory, portions of the retardation profile near local minima in the retardation profile can be noisier than other portions of the retardation profile. Without wishing to be bound by theory, portions of the retardation profile corresponding to interfaces between layers in a laminate sample can be noisier than other regions of the retardation profile. In some embodiments, the one or more excluded end portions can comprise a portion of the retardation profile near one or more local minima in the retardation profile and/or one or more portions corresponding to interfaces between layers in a laminate sample. Excluding the one or more end portions and exclude noisy portions of the retardation profile, which can produce more reliable central tension (CT) measurements.

Returning to FIG. 10, a fitting width can extend between a first location 1007 and a second location 1009 on the optical retardation profile. As shown, the fitting width excludes a first end portion comprising a first portion 1011 within the central region. The fitting width also excludes a second end portion comprising a second portion 1013 within the central region. Further, the first portion 1011 and the second portion 1013 correspond to regions near interfaces in the laminate sample, and both the first portion 1011 and the second portion 1013 are noisier than the fitting region 1015. As shown, a fitting width of the fitting region measured between the first location 1007 and the second location 1009 is less than the width of the central region demarcated by lines 1005.

After step 1407, step 1305 can further comprise step 1409 comprising fitting a polynomial to a portion of the retardation profile within the fitting range. In some embodiments, the portion may comprise the entire fitting range. In some embodiments, the polynomial may comprise a linear polynomial (e.g., a line). In some embodiments, the polynomial may comprise a quadratic polynomial (e.g., a parabola). In some embodiments, the polynomial may comprise a cubic polynomial. Without wishing to be bound by theory, a retardation profile for a laminate sample can be fit with a linear polynomial if the laminate sample is not substantially chemically strengthened and/or thermally tempered. Without wishing to be bound by theory, a retardation profile for a sample that has been chemically strengthened and/or thermally tempered can be fit using a cubic polynomial. Fitting the retardation profile with a low order (e.g., linear, quadratic, cubic) polynomial and reduce noise in the measured central tension (CT). For example, with reference to FIG. 10, the central region 1015 can be fit with a linear polynomial.

After step 1409, step 1305 can further comprise step 1411 comprising determining the central tension of the sample form the fitted polynomial. In some embodiments, the central tension can comprise a central tension profile. Without wishing to be bound by theory, the central tension (e.g., central tension profile) can be obtained by taking a derivative of the fitted polynomial. In some embodiments, the fitted polynomial may comprise a linear polynomial and the central tension profile may comprise a substantially constant (e.g., constant) central tension profile across the fitting width and/or the width of the central region. In some embodiments, the fitted polynomial can comprise a quadratic polynomial, and the central tension profile can comprise a line. In some embodiments, the fitted polynomial can comprise a cubic polynomial and the central tension profile can comprise a parabola. In some embodiments, a single value can be determined (e.g., reported) for the central tension, which can be the average (e.g., mean, median, mode) of the central tension profile determined or an extreme value (e.g., maximum, minimum) of the central tension profile determined. For example, with reference to FIG. 10, the central tension profile of the fitting region would comprise a constant, which can be reported as a single value of the central tension.

After step 1305, returning to the flow chart in FIG. 13, the method can proceed to step 1307 of measuring a refractive index profile of the sample and determining an initial stress profile of the sample from the measured refractive index profile. some embodiments, step 1307 can comprise a series of steps that will be discussed with reference to the flow chart in FIG. 15. In some embodiments, step 1307 can comprise steps 1503, 1505, 1507, 1509, and 1513. In further embodiments, arrow 1502 can be followed to step 1511 and then arrow 1504 can be followed to return to steps 1503, 1505, 1507, and 1509 before either following arrow 1502 again or proceeding to step 1513. For simplicity, a discussion of step 1511 and when arrows 1502, 1504 are followed is omitted in the present discussion but is discussed in more detail with regards to the method of determining a refractive index discussed later with regards to the flow chart in FIG. 15 later. In some embodiments, arrow 1506 can be followed omitting step 1509 and going directly from step 1507 to step 1513.

In some embodiments, as a result of step 1303 and as shown in FIG. 7, the sample 103 can be positioned between the first reference block 113 comprising the first refractive index and a second reference block 707 comprising a second refractive index, where the first refractive index can be substantially equal to the second refractive index (e.g., the second reference block 707 effectively comprises the first refractive index). In further embodiments, as a result of step 1303 and as shown in FIG. 7, the fluid 723 comprising the third refractive index can contact one or more of the first reference block 113, the second reference block 707, and/or the sample 103.

In some embodiments, step 1307 can comprise step 1503 comprising emitting a second polarization-switched light beam from a second polarization-switching light source 123. In further embodiments, as shown, the second polarization-switched light beam can travel along a second path 207, 207R.

After step 1503, as shown in FIG. 7, step 1307 can further comprise step 1505 comprising transmitting the second polarization-switched light beam through the sample holder 701. In further embodiments, as shown in FIG. 7, the second polarization-switched light beam can be focused by the converging lens 125 to form a focal point 709. In even further embodiments, as shown, the focal point 709 can comprise the first major surface 313 of the sample holder 701. In even further embodiments, as shown, the focal point 709 can comprise a location of the sample 103 positioned in the cavity 301. In even further embodiments, the method can comprise translating the sample holder 701 in a direction 711. In still further embodiments, the sample holder 701 can be translated in direction 711 so that the focal point moves from the first reference block 113 to the sample 103 to the second reference block 707. In still further embodiments, the sample holder 701 can be translated in direction 711 so that the focal point moves from the second reference block 707 to the sample 103 to the first reference block 113. In still further embodiments, the sample holder 701 can be translated in a direction 305. In further embodiments, as shown, the second polarization-switched light beam can be transmitted through the sample holder 701 before being transmitted through the first reference block 113, the cavity 301 configured to receive the sample 103, and/or the second reference block 707. In further embodiments, the second polarization-switched light beam can be transmitted through the fluid 723.

After step 1505, step 1307 can further comprise step 1507 comprising detecting the transmitted second polarization-switched light beam to determine the detected signal. In some embodiments, the transmitted second polarization-switched light beam can travel along portion 207R of the second path 207 as a refracted second polarization-switched light beam to the second detector 127. In some embodiments, the detected signal can be converted into a signal SA that is sent to the controller 141. In some embodiments, detected signals can be measured in two polarizations that are orthogonal to one another. In further embodiments, the detected signal(s) can be process by the controller 141 to determine an initial refractive index profile(s) for the sample 103. In some embodiments, as discussed above, the sample holder 701 can be translated in direction 711 while transmitting the second polarization-switched light beam through the sample 103 and/or detecting the transmitted second polarization-switched light beam. In some embodiments, multiple measurements corresponding to multiple detected signals may be combined (e.g., averaged) to produce a composite detected signal.

After step 1507, step 1307 can further comprise step 1509 comprising determining the refractive index (e.g., refractive index profile) based on data in the detected signal corresponding to the first reference block 113 and the second reference block 707 to determine a refractive index profile. In some embodiments, a first error can be calculated between an initial measured refractive index for the first reference block 113 and the predetermined first refractive index of the first reference block 113. In further embodiments, the refractive index profile can be determined by subtracting the first error from the detected signal (e.g., measured refractive index profile). In further embodiments, a second error can be calculated between an initial measured refractive index for the second reference block 707 and the predetermined second refractive index of the second reference block 707. In even further embodiments, an error profile can be calculated using the first error and the second error. In still further embodiments, the error profile can comprise an interpolation between the first error and the second error across the sample. In still further embodiments, the refractive index profile can be determined by subtracting the error profile from the detected signal (e.g., measured refractive index profile).

After step 1509, in some embodiments, step 1307 can further comprise step 1513 comprising determining a stress profile (e.g., an initial stress profile) from the measured refractive index profile. As mentioned above, the measured refractive index profile can comprise two measured refractive index profiles each based on a detected signal measured for a polarization state that is orthogonal to the other (e.g., TE and TM). In some embodiments, the stress profile can be calculated by taking the difference between the two measured refractive index profiles. In further embodiments, the stress profile can comprise the difference between the two measured refractive index profiles divided by a stress optical coefficient, which can be measured using any means known to those skilled in the art.

Figure 13:
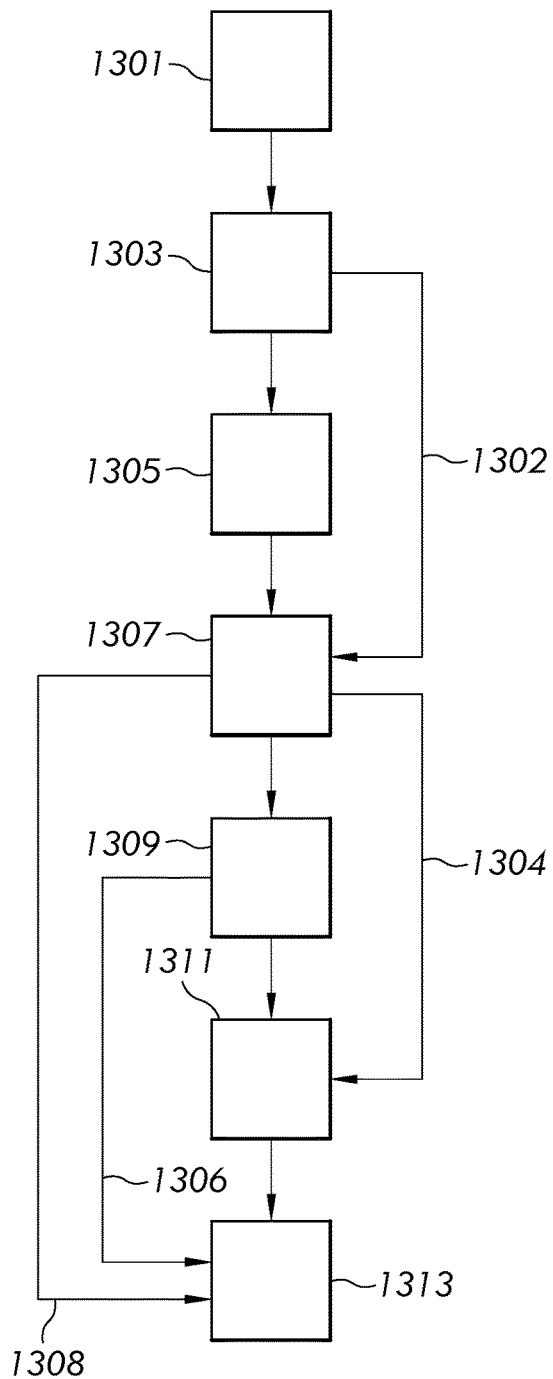
FIG. 13 is a flow chart illustrating example methods of measuring a stress profile in accordance with the embodiments of the disclosure.

After step 1307, returning to the flow chart in FIG. 13, the method can proceed to step 1309 comprising scaling the initial stress profile to obtain a scaled stress profile of the sample based on the initial stress profile and the central tension. In some embodiments, the entire stress profile can be scaled based on the ratio of the central tension measured in step 1305 and an estimated central tension based on the initial stress profile. In some embodiments, only the central region of the initial stress profile comprising the central tension may be scaled based on the ratio of the central tension measured in step 1305 and an estimated central tension based on the initial stress profile.

After step 1309, the method can proceed to step 1311 comprising adjusting the scale stress profile to obtain an estimated stress profile that is force balanced. As used herein, a stress profile is stress balanced if an integral from the first outer major surface 105 of the sample 103 to a midplane 623 of the sample 103 for the stress profile (e.g., estimated stress profile, scaled stress profile) is substantially 0 and an integral from the second outer major surface 309 of the sample 103 to a midplane 623 of the sample 103 for the stress profile (e.g., estimated stress profile, scaled stress profile) is substantially 0. As used herein and as indicated in FIG. 6, a midplane is located halfway between the first outer major surface 105 of the sample 103 and the second outer major surface 309 of the sample 103. In some embodiments, the stress profile (e.g., estimated stress profile, scaled stress profile) can be corrected if it is not force balanced by doing one or more of adjusting the surface stress (e.g., the stress at the first outer major surface 105 of the sample 103, the stress at the second outer major surface 309 of the sample 103), adjusting the stress on the outer side of the central region comprising the central tension, and/or adjusting a stress at the interface between a central tension and a compressive stress.

After step 1311, the method can be complete at step 1313 where the stress profile (e.g., estimated stress profile, adjusted stress profile, force balanced stress profile) has been determined.

In some embodiments, methods of determining a stress profile of a sample in accordance with the embodiments of the disclosure can proceed along steps 1301, 1303, 1305, 1307, 1309, 1311, 1313 sequentially, as discussed above. In some embodiments, the method may follow arrow 1302 omitting step 1305 and instead going directly from step 1303 to step 1307. In further embodiments, the method may additionally follow arrow 1304 omitting step 1309 and instead going directly from step 1307 to step 1311, where the initial stress profile can be adjusted to obtain an estimated stress profile that is force balanced. In further embodiments, the method may additionally follow arrow 1308 omitting steps 1309 and 1311 and instead going directly from step 1307 to step 1313, where the initial stress profile can comprise the stress profile determined by the method. In some embodiments, the method may follow arrow 1304 omitting step 1309 and instead going directly from step 1307 to step 1311, where the initial stress profile can be adjusted to obtain an estimated stress profile that is force balanced. In some embodiments, the method may follow arrow 1308 omitting steps 1309 and 1311 and instead going directly from step 1307 to step 1313, where the initial stress profile can comprise the stress profile determined by the method. In some embodiments, the method may follow arrow 1306 omitting step 1311 and instead going directly from step 1309 to step 1313, where the scaled stress profile can comprise the stress profile determined by the method. In further embodiments, the scaled stress profile may be force balanced without further adjusting the scaled stress profile.

Embodiments of methods of determining a central tension of a sample in accordance with the embodiments of the disclosure will be discussed with reference to the flow chart in FIG. 14.

In a first step 1401 of methods of determining a central tension of a sample, the method can comprise providing a sample 103 and positioning the sample 103 within the cavity 301 of the apparatus (e.g., combined apparatus 101, LSP apparatus 131, 131'). In some embodiments, as discussed above, the sample 103 may be provided by purchase or otherwise obtaining a sample or by forming the sample using methods known in the art. In some embodiments, as shown in FIGS. 3-4, the sample 103 may be secured by sample holder 701. In even further embodiments, as shown, the cavity 301 can be further defined by the sample holder 701.

After step 1401, the method can comprise step 1403 comprising measuring a retardation profile of the sample 103. In some embodiments, a first polarization-switched light beam can be emitted from the first polarization-switching light source 133 can configured to travel along the first path 205, 205F, 205R. In some embodiments, as shown in FIGS. 1-5, the first polarization-switched light beam can impinge on (e.g., be transmitted through) a first focusing lens 135 and/or other optical elements discussed with respect to the first focusing lens and/or the first path 205, 205F above. In some embodiments, as shown in FIGS. 1-5 the first polarization-switched light beam can impinge on (e.g., be transmitted through) the prism 113. In further embodiments, as shown in FIG. 4, the first polarization-switched light beam can impinge on the input surface 209 of the prism 113. In further embodiments, the first polarization-switched light beam can impinge on the specimen coupling surface 307 of the prism 113. In some embodiments, as shown in FIG. 5, the first polarization-switched light beam can impinge on the sample holder 701. In some embodiments, the first polarization-switched light beam can impinge on the index matching fluid 215. In some embodiments, the first path 205F and the first polarization-switched light beam can impinge on the first outer major surface 105 of the sample. In further embodiments, as shown in FIG. 6, the sample 103 can comprise a laminate comprising a core layer 601 positioned between a first outer layer 603 and a second outer layer 605. In even further embodiments, the core layer 601 can comprise the central tension. In even further embodiments, as shown the first path 205F and the first polarization-switched light beam can impinge on the first outer layer 603. In still further embodiments, the first path 205F and the first polarization-switched light beam can impinge on the core layer 601. In yet further embodiments, the first path 205F and the first polarization-switched light beam can impinge on the second outer layer 605. In some embodiments, the first path 205R, 205S and a scattered first polarization-switched light beam that has been transmitted through the sample 103 can impinge on the prism 113 and the first output surface 213 and/or second output surface 211 of the prism 113. In some embodiments, a first detector 137 can detect a signal from the first polarization-switched light beam comprising the scattered first polarization-switched light beam. In further embodiments, as shown in FIG. 3, the first detector 137 can comprise a first image detector 137A and a second image detector 137B that can each detect a signal from the first polarization-switched light beam. In some embodiments, the detected signal can comprise one or more line images comprising an intensity distribution along a direction. In some embodiments, the detected signal can be converted into a signal SB that is sent to the controller 141. In further embodiments, the detected signal from the first image detector 137A can be converted into signal SB while a detected signal from the second image detector 137B can be converted into signal SB', and both signals SB, SB' are sent to the controller 141. In some embodiments, the controller 141 can determine a retardation profile from the signal. As used herein, the retardation profile means an amount of optical retardation of the signal as a function of the depth that the first polarization-switched light beam traveled into the sample 103 in a direction 602. As used herein, the optical retardation means a phase shift between two orthogonal light polarizations, which can be measured in radians (rad) or nanometers (nm). Without wishing to be bound by theory, the amount of optical retardation can be determined from the detected signal, which varies due to the constructive and destructive interference for the different effective path lengths of the detected signal through the sample. Without wishing to be bound by theory, stress in the sample can cause optical retardation along the first path of the first polarization-switched light beam, with the amount of stress encountered being proportional to the derivative of the optical retardation. In some embodiments, one or more of the sample holder 701, the first stage 405, and the second stage 409 can be translated while transmitting the first polarization-switched light beam through the sample and/or detecting the transmitted first polarization-switched light beam. In some embodiments, multiple measurements corresponding to multiple detected signals may be combined (e.g., averaged) to produce a composite detected signal. In further embodiments, the sample holder 701 can be translated in direction 305 while measuring the retardation profile of the sample 103.

In some embodiments, the signal SB can resemble the intensity profile shown in FIG. 8, where the horizontal axis 801 is a distance in a direction and the vertical axis 803 is the intensity of the detected signal. In some embodiments, the optical retardation profile can resemble the optical retardation profile shown in FIG. 9, where the horizontal axis 901 is distance in direction 602 and the vertical axis 903 is optical retardation shown in length units (e.g., nm). In some embodiments, the optical retardation profile can comprise a reference region 905, a compressive region 907, and a tensile region 909.

After step 1403, the method can further comprise step 1405 comprising determining a width of a central region comprising the central tension. In some embodiments, the width of the central region can be determined based on the locations where the derivative of the measured retardation profile is substantially 0. As used herein, the width of the central region is the minimum distance between two locations where the derivative of the retardation profile is substantially zero and the locations comprise a pair of opposite extrema (e.g., a minima and a maxima) of the measured retardation profile. In some embodiments, the sample can comprise a laminate. In further embodiments, the width of the central region can be substantially equal to the core thickness 615 of the core layer 601 comprising the central tension. In some embodiments, multiple measured retardation profiles can be combined (e.g., averaged) and used to produce a lower noise retardation profile and width of the central region.

For example, FIG. 10 shows an experimental optical retardation profile 1017, where the horizontal axis 1001 is distance in direction 602 and the vertical axis 1003 is optical retardation shown in length units (e.g., nm). As shown, multiple measured retardation profiles can be combined to reduce noise in the retardation profile. In FIG. 10, the central region has been demarcated by lines 1005. One line 1005 is located at a minima while the other line 1005 is located at a maxima of the retardation profile. The width of the central region can be determined as the distance between the two lines 1005 demarcating the central region comprising the central tension.

After step 1405 or after step 1403 following arrow 1402, the method can further comprise step 1407 of determining a fitting range comprising a fitting width. In some embodiments, the fitting width can be less than the width of the central portion. In further embodiments, the fitting width can exclude one or more end portions of the retardation profile. In even further embodiments, the one or more end portions of the retardation profile excluded may comprise a portion of the central region. Without wishing to be bound by theory, portions of the retardation profile near local minima in the retardation profile can be noisier than other portions of the retardation profile. Without wishing to be bound by theory, portions of the retardation profile corresponding to interfaces between layers in a laminate sample can be noisier than other regions of the retardation profile. In some embodiments, the one or more excluded end portions can comprise a portion of the retardation profile near one or more local minima in the retardation profile and/or one or more portions corresponding to interfaces between layers in a laminate sample. Excluding the one or more end portions and exclude noisy portions of the retardation profile, which can produce more reliable central tension (CT) measurements.

Returning to FIG. 10, a fitting width can extend between a first location 1007 and a second location 1009 on the optical retardation profile. As shown, the fitting width excludes a first end portion comprising a first portion 1011 within the central region. The fitting width also excludes a second end portion comprising a second portion 1013 within the central region. Further, the first portion 1011 and the second portion 1013 correspond to regions near interfaces in the laminate sample, and both the first portion 1011 and the second portion 1013 are noisier than the fitting region 1015. As shown, a fitting width of the fitting region measured between the first location 1007 and the second location 1009 is less than the width of the central region demarcated by lines 1005.

After step 1407, the method can further comprise step 1409 comprising fitting a polynomial to a portion of the retardation profile within the fitting range. In some embodiments, the portion may comprise the entire fitting range. In some embodiments, the polynomial may comprise a linear polynomial (e.g., a line). In some embodiments, the polynomial may comprise a quadratic polynomial (e.g., a parabola). In some embodiments, the polynomial may comprise a cubic polynomial. Without wishing to be bound by theory, a retardation profile for a laminate sample can be fit with a linear polynomial if the laminate sample is not substantially chemically strengthened and/or thermally tempered. Without wishing to be bound by theory, a retardation profile for a sample that has been chemically strengthened and/or thermally tempered can be fit using a cubic polynomial. Fitting the retardation profile with a low order (e.g., linear, quadratic, cubic) polynomial and reduce noise in the measured central tension (CT). For example, with reference to FIG. 10, the central region 1015 can be fit with a linear polynomial.

After step 1409, the method can further comprise step 1411 comprising determining the central tension of the sample form the fitted polynomial. In some embodiments, the central tension can comprise a central tension profile. Without wishing to be bound by theory, the central tension (e.g., central tension profile) can be obtained by taking a derivative of the fitted polynomial. In some embodiments, the fitted polynomial may comprise a linear polynomial and the central tension profile may comprise a substantially constant (e.g., constant) central tension profile across the fitting width and/or the width of the central region. In some embodiments, the fitted polynomial can comprise a quadratic polynomial, and the central tension profile can comprise a line. In some embodiments, the fitted polynomial can comprise a cubic polynomial and the central tension profile can comprise a parabola. In some embodiments, a single value can be determined (e.g., reported) for the central tension, which can be the average (e.g., mean, median, mode) of the central tension profile determined or an extreme value (e.g., maximum, minimum) of the central tension profile determined. For example, with reference to FIG. 10, the central tension profile of the fitting region would comprise a constant, which can be reported as a single value of the central tension.

Embodiments of methods of determining a refractive index (e.g., refractive index profile, corrected refractive index, corrected refractive index profile) and/or a stress profile of a sample in accordance with the embodiments of the disclosure will be discussed with reference to the flow chart in FIG. 15.

In a first step 1501 of methods of determining a refractive index and/or a stress profile of a sample, the method can comprise providing a sample 103 and positioning the sample 103 within the cavity 301 of the apparatus (e.g., combined apparatus 101, RNF apparatus 121). In some embodiments, as discussed above, the sample 103 may be provided by purchase or otherwise obtaining a sample or by forming the sample using methods known in the art. In some embodiments, as shown in FIG. 7, the sample 103 can be positioned between the first reference block 113 comprising the first refractive index and a second reference block 707 comprising a second refractive index, where the first refractive index can be substantially equal to the second refractive index (e.g., the second reference block 707 effectively comprises the first refractive index). In further embodiments, as shown, the fluid 723 comprising the third refractive index can contact one or more of the prism 113, the first reference block 113, the second reference block 707, and/or the sample 103.

In some embodiments, the sample 103 can comprise an estimated refractive index. In further embodiments, the first reference block 113 can comprise a first refractive index (e.g., first predetermined refractive index) and the fluid 723 can comprise a third refractive index (e.g., third predetermined refractive index) that can each satisfy one or more of the following conditions on the magnitude of the minimum difference compared to the estimated refractive index of the sample (i) as a percentage of the estimated refractive index of the sample and/or (ii) as an absolute value of the minimum difference. In some embodiments, a magnitude of a minimum difference between the estimated refractive index of the sample 103 and the third refractive index of the fluid 723 as a percentage of the sample refractive index can be about 0.7% or more, about 1% or more, about 2% or more, about 3% or more about 5% or more, about 10% or less, about 8% or less, or about 6% or less. In some embodiments, a magnitude of a minimum difference between the estimated refractive index of the sample 103 and the third refractive index of the fluid 723 as a percentage of the sample refractive index can be in a range from about 0.7% to about 10%, from about 0.7% to about 8%, from about 0.7% to about 6%, from about 0.7% to about 4%, from about 1% to about 10%, from about 1% to about 8%, from about 1% to about 6%, from about 2% to about 10%, from about 2% to about 8%, from about 2% to about 6%, from about 3% to about 8%, from about 3% to about 6%, from about 5% to about 10%, from about 5% to about 8%, from about 5% to about 6%, or any range or subrange therebetween. In some embodiments, a magnitude of a minimum difference between the estimated refractive index of the sample 103 and the third refractive index of the fluid 723 can be about 0.006 or more, about 0.01 or more, 0.02 or more, about 0.04 or more, about 0.06 or more, about 0.10 or less, about 0.08 or less, or about 0.06 or less. In some embodiments, a magnitude of a minimum difference between the estimated refractive index of the sample 103 and the third refractive index of the fluid 723 can be in a range from about 0.006 to about 0.10, from about 0.006 to about 0.08, from about 0.006 to about 0.06, from about 0.02 to about 0.10, from about 0.02 to about 0.08, from about 0.02 to about 0.06, from about 0.04 to about 0.10, from about 0.04 to about 0.08, from about 0.04 to about 0.06, from about 0.06 to about 0.10, from about 0.06 to about 0.08, or any range or subrange therebetween. Providing a first reference block comprising a first refractive index and a fluid comprising a third refractive index that each fall within one of the above specified ranges can enhance the reliability, precision, and/or accuracy of the measured refractive index and/or stress profile.

In some embodiments, the method can comprise step 1503 comprising emitting a second polarization-switched light beam from a second polarization-switching light source 123. In further embodiments, as shown, the second polarization-switched light beam can travel along a second path 207, 207R.

After step 1503, as shown in FIG. 7, the method can further comprise step 1505 comprising transmitting the second polarization-switched light beam through the sample holder 701. In further embodiments, as shown in FIG. 7, the second polarization-switched light beam can be focused by the converging lens 125 to form a focal point 709. In even further embodiments, as shown, the focal point 709 can comprise the first major surface 313 of the sample holder 701. In even further embodiments, as shown, the focal point 709 can comprise a location of the sample 103 positioned in the cavity 301. In even further embodiments, the method can comprise translating the sample holder 701 in a direction 711. In still further embodiments, the sample holder 701 can be translated in direction 711 so that the focal point moves from the first reference block 113 to the sample 103 to the second reference block 707. In still further embodiments, the sample holder 701 can be translated in direction 711 so that the focal point moves from the second reference block 707 to the sample 103 to the first reference block 113. In further embodiments, as shown, the second polarization-switched light beam can be transmitted through the sample holder 701 before being transmitted through the first reference block 113, the cavity 301 configured to receive the sample 103, and/or the second reference block 707. In further embodiments, the second polarization-switched light beam can be transmitted through the fluid 723.

After step 1505, the method can further comprise step 1507 comprising detecting the transmitted second polarization-switched light beam to determine the detected signal. In some embodiments, the transmitted second polarization-switched light beam can travel along portion 207R of the second path 207 as a refracted second polarization-switched light beam to the second detector 127. In some embodiments, the detected signal can be converted into a signal SA that is sent to the controller 141. In some embodiments, detected signals can be measured in two polarizations that are orthogonal to one another (e.g., TE, TM). In further embodiments, the detected signal(s) can be process by the controller 141 to determine an initial refractive index profile(s) for the sample 103. In some embodiments, the sample holder 701 can be translated in direction 711 while transmitting the second polarization-switched light beam through the sample and/or detecting the transmitted second polarization-switched light beam. In some embodiments, multiple measurements corresponding to multiple detected signals may be combined (e.g., averaged) to produce a composite detected signal.

After step 1507, the method can further comprise step 1509 comprising determining the refractive index (e.g., refractive index profile) based on data in the detected signal corresponding to the first reference block 113 and the second reference block 707 to determine a refractive index profile. In some embodiments, a first error can be calculated between an initial measured refractive index for the first reference block 113 and the predetermined first refractive index of the first reference block 113. In further embodiments, the refractive index profile can be determined by subtracting the first error from the detected signal (e.g., measured refractive index profile). In further embodiments, a second error can be calculated between an initial measured refractive index for the second reference block 707 and the predetermined second refractive index of the second reference block 707. In even further embodiments, an error profile can be calculated using the first error and the second error. In still further embodiments, the error profile can comprise an interpolation between the first error and the second error across the sample. In still further embodiments, the refractive index profile can be determined by subtracting the error profile from the detected signal (e.g., measured refractive index profile).

In further embodiments, the first refractive index of the first reference block 113 and/or the third refractive index of the fluid 723 can be compared to the refractive index (e.g., refractive index profile) measured in step 1509 above for the sample 103. If the first refractive index of the first refractive index of the first reference block 113 and/or the third refractive index of the fluid 723 relative to the measured refractive index (e.g., measured refractive index profile) fail to fall within one or more of the ranges discussed above for the magnitude of the minimum difference compared to the measured refractive index of the sample (i) as a percentage of the estimated refractive index of the sample and/or (ii) as an absolute value of the minimum difference, then arrow 1502 can be followed to step 1511. In some embodiments, step 1511 can comprise replacing the first reference block with new first reference block comprising a corrected first refractive index, where the magnitude of the minimum difference between the corrected first refractive index and the refractive index (e.g., measured refractive index) of the sample falls within one or more of the ranges discussed above. In some embodiments, step 1511 can comprise replacing the fluid with new fluid comprising a corrected third refractive index, where the magnitude of the minimum difference between the corrected third refractive index and the refractive index (e.g., measured refractive index) of the sample falls within one or more of the ranges discussed above. In further embodiments, both the first reference block and the fluid can be replaced. In some embodiments, then arrow 1504 can then be followed to return to steps 1503, 1505, 1507, and 1509 before either following arrow 1502 again until the first refractive index and third refractive index used in measuring the refractive index of the sample satisfy one or more of the above ranges before proceeding to step 1513. In some embodiments, arrow 1504 can be followed to return to steps 1503, 1505, 1507, and 1509 before proceeding to step 1513.

After step 1509, in some embodiments, the method can further comprise step 1513 comprising determining a stress profile (e.g., an initial stress profile) from the measured refractive index profile. As mentioned above, the measured refractive index profile can comprise two measured refractive index profiles each based on a detected signal measured for a polarization state that is orthogonal to the other (e.g., TE, TM). In some embodiments, the stress profile can be calculated by taking the difference between the two measured refractive index profiles. In further embodiments, the stress profile can comprise the difference between the two measured refractive index profiles divided by a stress optical coefficient, which can be measured using any means known to those skilled in the art.

After step 1513, in some embodiments, the method can proceed to step 1515 comprising adjusting the stress profile to obtain an estimated stress profile that if force balanced, as discussed above with regards to step 1311.

EXAMPLES

Figure 11:
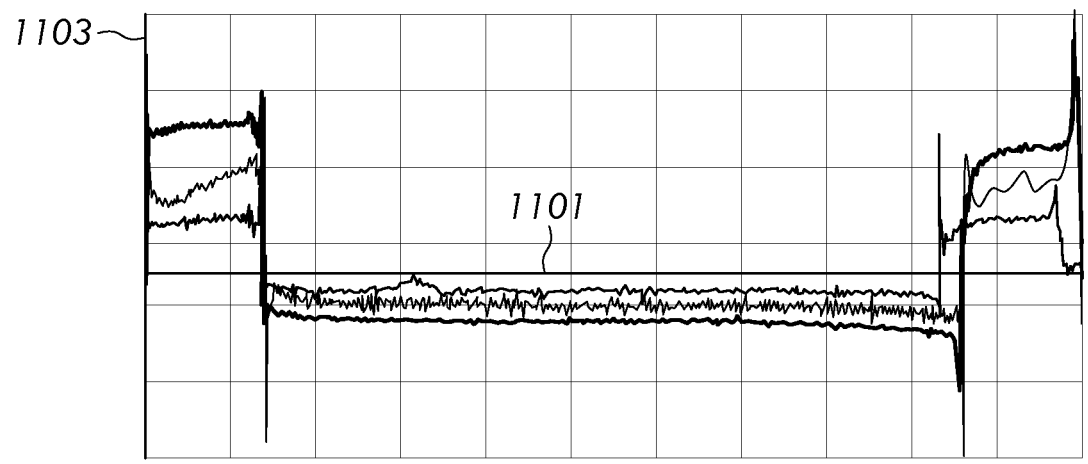
FIG. 11 is a series of stress profiles measured for the same sample.
Figure 12:
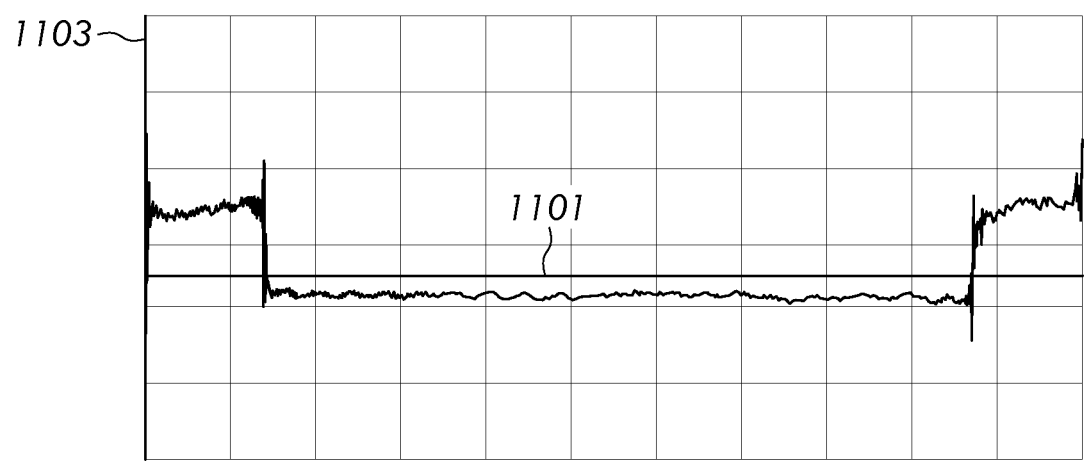
FIG. 12 is a series of stress profiles measured for the same sample in accordance with the embodiments of the disclosure.

Various embodiments will be further clarified by the following examples. FIGS. 11-12 and Table 1 will be used to demonstrate the impact of the choice of the first refractive index of the first reference block and the third refractive index of the fluid on the accuracy, precision, reliability, and consistency of the measured refractive index and stress profile using the method of the disclosure. In all examples, the sample comprised a laminate resembling FIG. 6 where the core layer comprised a refractive index (Core RI) of 1.496 while the first outer layer and the second outer layer comprised a refractive index (Outer RI) of 1.475.

Table 1 presents the measured refractive index (RI) for the core layer and the average measured RI for the outer layers of the sample. The reference block comprises a first refractive index (Reference Block RI) of either 1.4622 or 1.4847. Based on the known refractive index of the core and outer layers of the sample, the magnitude of the minimum difference between the Reference Block RI and the sample RI are 0.013 (0.9%) and 0.009 (0.7%), respectively. The fluid comprises a third refractive index (Fluid RI) of either 1.498, 1.517, or 1.5945. Based on the known refractive index of the core and outer layers of the sample, the magnitude of the minimum difference between the Fluid RI and the sample RI are 0.002 (0.1%) and 0.021 (1.4%), and 0.099 (6.6%), respectively.

TABLE 1

Refractive Index (RI) of Reference Block and Fluid of Examples A-F

| Example | Reference Block RI | Fluid RI | Measured RI of Core | Measured RI of Outer Layers | Core RI % Error | Outer RI % Error |
|---|---|---|---|---|---|---|
| A | 1.4622 | 1.5945 | 1.5280 | 1.4858 | −2.14 | −0.73 |
| B | 1.4622 | 1.5945 | 1.5329 | 1.4917 | −2.47 | −1.13 |
| C | 1.4847 | 1.498 | 1.5079 | 1.4468 | −0.80 | 1.91 |
| D | 1.4847 | 1.498 | 1.4752 | 1.4912 | 1.39 | −1.10 |
| E | 1.4622 | 1.517 | 1.4938 | 1.4728 | 0.15 | 0.15 |
| F | 1.4622 | 1.517 | 1.4931 | 1.4723 | 0.19 | 0.11 |

Examples A and B comprise a Reference Block RI of 1.4622 and a Fluid RI of 1.5945 corresponding to magnitudes of minimum differences of 0.013 (0.9%) and 0.099 (6.6%). Examples A and B both underestimate the Core RI by more than 2% and underestimate the Outer RI. While Examples A and B demonstrate good precision (both measurements with 0.4% of each other), Examples A and B demonstrate the worst accuracy of the examples presented.

Examples C and D comprise a Reference Block RI of 1.4847 and a Fluid RI of 1.498 corresponding to magnitudes of minimum differences of 0.097 (0.7%) and 0.002 (0.1%). Example C underestimates the Core RI by 0.80% and overestimates the Outer RI by 1.91% while Example D overestimates the Core RI by 1.39% and underestimates the Outer RI by 1.10%. In other words, Examples C and D demonstrate opposite errors, suggesting poor precision of the measurement, which is reinforced by the more than 2% difference between Example C and Example D.

Examples E and F comprise a Reference Block RI of 1.4622 and a Fluid RI of 1.517 corresponding to magnitudes of minimum differences of 0.013 (0.9%) and 0.021 (1.4%), respectively. Examples D and E only overestimate the Core RI and Outer RI by between 0.1% and 0.2%, demonstrating good accuracy. The measurements from D and E are the closest together, demonstrating good precision and reliability. As such, Examples E and F demonstrate the best accuracy, precision, and reliability.

Based on Examples A-F, the examples with better accuracy and reliability had magnitudes of minimum differences of about 0.099 (6.6%) or less, about 0.021 (1.4%) or less, about 0.009 (0.7%) or more, about 0.013 (0.9%) or more, or about 0.021 (1.4%) or more. As such, improved accuracy, precision, and/or reliability can be expected for minimum differences in a range from about 0.009 to about 0.099, from about 0.009 to about 0.021, from about 0.013 to about 0.099, from about 0.013 to about 0.021, from about 0.021 to about 0.099, or any range or subrange therebetween. improved accuracy, precision, and/or reliability can be expected for minimum differences in a range from about 0.7% to about 6.6%, from about 0.7% to about 1.4%, from about 0.9% to about 6.6%, from about 0.9% to about 1.4%, from about 1.4% to about 6.6%, or any range or subrange therebetween. Further improvements in accuracy, precision, and/or reliability can be expected when both the reference block and the fluid comprise minimum differences within one or more of the above specified ranges.

FIGS. 11-12 comprise stress profiles experimentally measured. The horizontal axis 1101 comprises a depth from the first outer major surface 105 of the sample measured in the direction 602. The vertical axis 1103 comprises stress. FIGS. 11-12 comprise the same plotting range. In other words, FIGS. 11-12 are shown at the same scale.

FIG. 11 corresponds to three stress profiles experimentally measured using an RNF apparatus comprising a single reference block comprising a Block RI of 1.4622 and a fluid comprising a Fluid RI of 1.517. The average compressive stress of the sample for the measurements were 140 MPa, 250 MPa, and 400 MPa. The average central tension of the sample for the measurements were 48 MPa, 55 MPa, and 132 MPa. The measurements shown in FIG. 11 demonstrate a wide variability, reflecting poor precision and reliability.

FIG. 12 correspond to three stress profiles experimentally measured using the combined apparatus of the embodiments of the disclosure comprising a first reference block and a second reference block comprising a Block RI of 1.4622 and a fluid comprising a Fluid RI of 1.517. The stress profiles for all three measurements of the sample superimpose on one another such that only a single stress profile is visible, demonstrated a surprising level of precision and reliability. In contrast to the variability in the measurements shown in FIG. 11, FIG. 12 represents a dramatic improvement in the measurement of stress profiles.

The above can be combined to provide apparatus and methods for determining refractive index, central tension, or stress profiles for samples. The combined apparatus for measurements using LSP and RNF can simplify and speed up the measurement process. Also, the combined apparatus reduces the risk of sample breakage because less handling is required to load the sample into the combined apparatus as compared to two separate apparatus. Methods of using the combined apparatus can additionally produce more reliable measurements for overall stress profiles.

The combined apparatus or an LSP apparatus can be used in a method of measuring a central tension (CT). The methods of the disclosure can produce more reliable CT measurements excluding noisy portions (e.g., end portions) of the measurement near the edge of the CT region (e.g., an interface between layers in a laminate). Methods of the disclosure can also produce more reliable CT measurement by moving the sample during measurement, which can be processed to produce an averaged intensity distribution with lower noise.

The combined apparatus or an RNF apparatus can comprise more than one reference block. Positioning reference blocks that sandwich a cavity configured to receive a sample can provide a means to correct drift and other systematic errors present in the measurement. Providing at least one reference block with a first refractive index and a fluid comprising a third refractive index that straddles an estimated refractive index (e.g., range of an estimated refractive index profile) of the sample can provide more accurate and reproducible measurements of refractive index and/or stress profile. Further, providing a magnitude of a minimum difference between the at least one reference block comprising the first refractive index and the estimated refractive index (e.g., extrema of an estimated refractive index profile) of the sample that is in a range from about 0.7% to about 10% of the sample refractive index and/or is in a range from about 0.006 to about 0.10 can provide further improvements in the reliability and/or reproducibility of the refractive index and/or stress profile measurement. Further, providing a magnitude of a minimum difference between the fluid comprising the third refractive index and the estimated refractive index (e.g., extrema of an estimated refractive index profile) of the sample that is in a range from about 0.7% to about 10% of the sample refractive index and/or is in a range from about 0.006 to about 0.10 can provide further improvements in the reliability and/or reproducibility of the refractive index and/or stress profile measurement. In some embodiments, the at least one reference block and/or fluid can be replaced after measuring a corrected refractive index (e.g., refractive index profile) of the sample so that the at least one reference block and/or fluid satisfy the above condition(s).

Directional terms as used herein—for example, up, down, right, left, front, back, top, bottom—are made only with reference to the figures as drawn and are not intended to imply absolute orientation.

It will be appreciated that the various disclosed embodiments may involve features, elements, or steps that are described in connection with that embodiment. It will also be appreciated that a feature, element, or step, although described in relation to one embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. For example, reference to "a component" comprises embodiments having two or more such components unless the context clearly indicates otherwise. Likewise, a "plurality" is intended to denote "more than one."

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Ranges can be expressed herein as from "about" one particular value, and/or to "about" another particular value. When such a range is expressed, embodiments include from the one particular value and/or to the other particular value. Similarly, when values are expressed as approximations, by use of the antecedent "about," it will be understood that the particular value forms another embodiment. Whether or not a numerical value or endpoint of a range in the specification recites "about," the numerical value or endpoint of a range is intended to include two embodiments: one modified by "about," and one not modified by "about." It will be further understood that the endpoints of each of the ranges are significant both in relation to the other endpoint and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, for example, within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to an apparatus that comprises A+B+C include embodiments where an apparatus consists of A+B+C and embodiments where an apparatus consists essentially of A+B+C. As used herein, the terms "comprising" and "including", and variations thereof shall be construed as synonymous and open-ended unless otherwise indicated.

The above embodiments, and the features of those embodiments, are exemplary and can be provided alone or in any combination with any one or more features of other embodiments provided herein without departing from the scope of the disclosure.

It will be apparent to those skilled in the art that various modifications and variations can be made to the present disclosure without departing from the spirit and scope of the disclosure. Thus, it is intended that the present disclosure cover the modifications and variations of the embodiments herein provided they come within the scope of the appended claims and their equivalents.

What is claimed is:

1. An apparatus for measuring a stress profile of a sample comprising:
   a cavity at least partially defined by a first major surface of a first reference block comprising a first refractive index, the cavity configured to receive the sample;
   a first polarization-switching light source configured to emit a first polarization- switched light beam toward the cavity;
   a second polarization-switching light source configured to emit a second polarization-switched light beam toward the cavity;
   a first detector configured to detect a signal from the first polarization-switched light beam; and
   a second detector configured to detect a signal from the second polarization-switched light beam; and
   a sample holder comprising a first major surface facing the cavity and a second major surface opposite the first major surface, the sample holder positioned between the second polarization-switching light source and the cavity,
   wherein the first polarization-switched light beam is configured to travel along a first beam path that impinges an input surface of the first reference block at a substantially normal angle of incidence before impinging the cavity, and
   wherein the second polarization-switched light beam is configured to travel along a second beam path, the second beam path impinges on the second major surface of the sample holder at an angle relative to a direction normal to the second major surface of the sample holder in a range from about 10° to about 15° before impinging the cavity, and the first reference block is positioned between the second detector and the cavity, and the first reference block is positioned between the second detector and a second reference block.

2. The apparatus of claim 1, wherein the sample holder is translatable in a direction perpendicular to the first major surface of the first reference block.

3. The apparatus of claim 2, wherein the sample holder is positioned between the first polarization-switching light source and the cavity.

4. The apparatus of claim 2, wherein the cavity is further defined by a second major surface of the second reference block comprising a second refractive index.

5. The apparatus of claim 4, wherein the second refractive index is substantially equal to the first refractive index.

6. The apparatus of claim 4, wherein the second refractive index is substantially equal to the first refractive index.

7. The apparatus of claim 1, further comprising a liquid contacting the first reference block, the liquid comprising a third refractive index.

8. The apparatus of claim 7, wherein the third refractive index is greater than the first refractive index.

9. The apparatus of claim 7, wherein a magnitude of a difference between the first refractive index and the third refractive index is about 0.05 or more.

10. The apparatus of claim 1, wherein the second polarization-switched light beam is configured to form a focal point at an interface between the first major surface of the sample holder and the cavity.

11. A method of determining an estimated stress profile of a sample comprising:
    positioning the sample between a first reference block comprising a first refractive index and a second reference block comprising a second refractive index;
    emitting a first polarization-switched light beam from a first polarization-switching light source;
    transmitting the first polarization-switched light beam through a prism and the sample, and the first polarization-switched light beam travels along a first beam path that impinges an input surface of the first reference block at a substantially normal angle of incidence before impinging the sample;
    detecting the transmitted first polarization-switched light beam to determine a retardation profile of the sample;
    determining a central tension of the sample from the measured retardation profile of the sample;
    emitting a second polarization-switched light beam from a second polarization- switching light source;
    transmitting the second polarization-switched light beam through the first reference block, the sample, and the second reference block, and the second polarization-switched light beam travels along a second beam path that impinges a second major surface of a sample holder at an angle relative to a direction normal to the second major surface of the sample holder in a range from about 10° to about 15° before impinging the sample;
    detecting the transmitted second polarization-switched light beam to determine a detected signal;
    adjusting the detected signal based on data in the detected signal corresponding to the first reference block and the second reference block to determine a refractive index profile of the sample and an estimated refractive index;
    determining an initial stress profile of the sample from the refractive index profile;
    scaling the initial stress profile to obtain a scaled stress profile of the sample based on the initial stress profile and the central tension; and
    adjusting the scaled stress profile to obtain the estimated stress profile that is force balanced.

12. The method of claim 11, wherein the sample comprises a laminate comprising a core layer positioned between a first outer layer and a second outer layer, the core layer comprising the central tension.

13. The method of claim 11, wherein the sample comprises a glass-based sample.

14. The method of claim 11, wherein determining the central tension comprises:
   determining a width of a central region comprising the central tension;
   determining a fitting range comprising a fitting width that is less than the width of the central region that excludes one or more end portions of the retardation profile;
   fitting a polynomial to a portion of the retardation profile within the fitting range; and
   determining the central tension of the sample from the fitted polynomial.

15. The method of claim 14, wherein the sample comprises a glass-based sample.

16. The method of claim 14, wherein the sample comprises a laminate comprising a core layer positioned between a first outer layer and a second outer layer, the core layer comprising the central tension.

17. The method of claim 14, wherein the fitted polynomial comprises a line.

18. The method of claim 11, wherein a magnitude of a minimum difference between the first refractive index and the estimated refractive index of the sample is in a range from about 0.7% to about 10% of the estimated refractive index, and a magnitude of a minimum difference between the second refractive index and the estimated refractive index is in a range from about 0.7% to about 10% of the estimated refractive index.

19. The method of claim 18, wherein the magnitude of the minimum difference between the first refractive index and the estimated refractive index of the sample is in a range from about 0.006 to about 0.10, and the magnitude of the minimum difference between the second refractive index and the estimated refractive index of the sample is in a range from about 0.006 to about 0.10.

20. The method of claim 11, further comprising:
   before emitting the second polarization-switched light beam, contacting the first reference block with a liquid comprising a third refractive index,
   wherein a magnitude of a minimum difference between the first refractive index and the estimated refractive index of the sample is in a range from about 0.7% to about 10% of the estimated refractive index, a magnitude of a minimum difference between the second refractive index and the estimated refractive index is in a range from about 0.7% to about 10% of the estimated refractive index, and transmitting the second polarization-switched light beam further comprises transmitting the second polarization-switched light beam through the liquid.

21. The method of claim 11, wherein measuring the refractive index profile comprises simultaneously measuring the refractive index profile using two detectors oriented at an angle in a range from about 85° to about 95° relative to each other.

22. The method of claim 11, further comprising, before emitting the second polarization-switched light beam, contacting the first reference block with a liquid comprising a third refractive index, wherein the transmitting the second polarization-switched light beam further comprises transmitting the second polarization-switched light beam through the liquid.

23. The method of claim 22, further comprising:
   replacing the first reference block with another reference block comprising a first corrected refractive index;
   replacing the liquid with another liquid comprising a third corrected refractive index;
   transmitting the first polarization-switched light beam through the liquid, the another reference block, and the sample;
   detecting the transmitted first polarization-switched light beam to determine another detected signal;
   estimating a corrected refractive index of the sample based on the another detected signal; and
   determining a stress profile based on the another detected signal and the corrected refractive index, wherein a magnitude of a minimum difference between the first corrected refractive index and the estimated refractive index of the sample is in a range from about 0.7% to about 10% of the estimated refractive index, and a magnitude of a minimum difference between the third corrected refractive index and the estimated refractive index is in a range from about 0.7% to about 10% of the estimated refractive index.

24. The method of claim 23, wherein the minimum difference between the first corrected refractive index and the estimated refractive index of the sample is in a range from about 0.006 and 0.10, and the magnitude of the minimum difference between the third corrected refractive index and the estimated refractive index is in a range from about 0.006 to about 0.10.

25. The method of claim 23, wherein the sample comprises a glass-based sample.

26. The method of claim 23, wherein the sample comprises a laminate comprising a core layer positioned between a first outer layer and a second outer layer, the core layer comprising the central tension.

* * * * *

UNITED STATES PATENT AND TRADEMARK OFFICE
CERTIFICATE OF CORRECTION

PATENT NO. : 11,573,078 B2
APPLICATION NO. : 17/103105
DATED : February 7, 2023
INVENTOR(S) : William John Furnas et al.

It is certified that error appears in the above-identified patent and that said Letters Patent is hereby corrected as shown below:

In the Claims

In Column 39, Line 35, in Claim 1, delete "polarization- switched" and insert -- polarization-switched --.

In Column 39, Line 41, in Claim 1, after "beam;" delete "and".

In Column 40, Line 4, in Claim 4, delete "claim 2," and insert -- claim 1, --.

In Column 40, Line 41, in Claim 11, delete "polarization- switching" and insert -- polarization-switching --.

Signed and Sealed this
Third Day of October, 2023

Katherine Kelly Vidal
Director of the United States Patent and Trademark Office